United States Patent
Nagatoshi et al.

(10) Patent No.: US 12,181,784 B2
(45) Date of Patent: Dec. 31, 2024

(54) PROJECTION LENS

(71) Applicant: FUJIFILM Corporation, Tokyo (JP)

(72) Inventors: Yukiko Nagatoshi, Saitama (JP); Shoki Kasahara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 746 days.

(21) Appl. No.: 17/241,762

(22) Filed: Apr. 27, 2021

(65) Prior Publication Data
US 2021/0247672 A1    Aug. 12, 2021

Related U.S. Application Data

(63) Continuation of application No. PCT/JP2019/043326, filed on Nov. 5, 2019.

(30) Foreign Application Priority Data

Nov. 2, 2018 (JP) .................................. 2018-207733

(51) Int. Cl.
*G03B 21/14* (2006.01)
*G02B 13/16* (2006.01)

(52) U.S. Cl.
CPC ........... *G03B 21/142* (2013.01); *G02B 13/16* (2013.01); *G03B 21/145* (2013.01)

(58) Field of Classification Search
CPC .... G02B 21/142; G02B 13/16; G02B 21/145; G02B 7/023; G02B 7/04; G02B 21/28
See application file for complete search history.

(56) References Cited

U.S. PATENT DOCUMENTS

| | | | |
|---|---|---|---|
| 11,871,160 B2 * | 1/2024 | Shimizu | .................... G02B 7/04 |
| 11,892,704 B2 * | 2/2024 | Yen | ........................ G03B 21/142 |
| 11,921,408 B2 * | 3/2024 | Otsuki | ................... G03B 21/16 |
| 12,007,678 B2 * | 6/2024 | Kiyama | ................... G02B 9/10 |

(Continued)

FOREIGN PATENT DOCUMENTS

| | | |
|---|---|---|
| CN | 1894974 A | 1/2007 |
| JP | 2001-83387 A | 3/2001 |

(Continued)

OTHER PUBLICATIONS

International Preliminary Report on Patentability and Written Opinion of the International Searching Authority, with an English translation, dated May 14, 2021, for International Application No. PCT/JP2019/043326.

(Continued)

*Primary Examiner* — George G. King
*Assistant Examiner* — Anna Smith
(74) *Attorney, Agent, or Firm* — Birch, Stewart, Kolasch & Birch, LLP

(57) ABSTRACT

A projection lens, which is a projection lens to be attached to a projection apparatus body having an electro-optical device, includes: a zoom optical system including a plurality of lenses; a first holding portion that is to be connected to the projection apparatus body and through which light along a first optical axis passes; and a second holding portion through which light along a second optical axis, which is bent with respect to the first optical axis, passes and that is rotatable relative to the first holding portion. The zoom optical system is held by the first holding portion.

20 Claims, 11 Drawing Sheets

(56) References Cited

U.S. PATENT DOCUMENTS

| | | | |
|---|---|---|---|
| 12,072,615 B2* | 8/2024 | Okubo | G03B 21/28 |
| 2004/0257539 A1* | 12/2004 | Peterson | G03B 21/60 353/69 |
| 2007/0081131 A1 | 4/2007 | Van Der Palen et al. | |
| 2008/0010234 A1 | 1/2008 | Nakagawa et al. | |
| 2017/0045809 A1 | 2/2017 | Sasazaki et al. | |
| 2018/0217477 A1 | 8/2018 | Kurota et al. | |
| 2018/0217489 A1 | 8/2018 | Kuroda | |
| 2019/0025679 A1* | 1/2019 | Kuroda | G03B 21/14 |
| 2019/0101812 A1* | 4/2019 | Tamura | G03B 21/005 |
| 2019/0219915 A1* | 7/2019 | Kayano | G02B 7/023 |
| 2021/0033830 A1* | 2/2021 | Yasui | G02B 17/08 |
| 2021/0109428 A1* | 4/2021 | Ichieda | G03B 21/147 |

FOREIGN PATENT DOCUMENTS

| | | |
|---|---|---|
| JP | 2007-88679 A | 4/2007 |
| JP | 2007-515681 A | 6/2007 |
| JP | 2007-316519 A | 12/2007 |
| JP | 2008-15886 A | 1/2008 |
| JP | 2008-51886 A | 3/2008 |
| JP | 2014-102416 A | 6/2014 |
| JP | 2015-215376 A | 12/2015 |
| JP | 2018-124311 A | 8/2018 |
| WO | WO 2015/170507 A1 | 11/2015 |
| WO | WO 2017/056925 A1 | 4/2017 |
| WO | WO 2018/055964 A1 | 3/2018 |

OTHER PUBLICATIONS

International Search Report, dated Jan. 7, 2020, for International Application No. PCT/JP2019/043326, with an English translation.
Japanese Office Action, daled Aug. 27, 2019, for Japanese Application No. 2018-207733, with an English translation.
Japanese Office Action, dated Feb. 16, 2021, for Japanese Application No. 2020-056772, with an English translation.
Japanese Office Action, dated Jan. 7, 2020, for Japanese Application No. 2018-207733, with an English translation.
Chinese Office Action and Search Report for Chinese Application No. 201980071387.0, dated Nov. 15, 2021, with an English translation.

* cited by examiner

PROJECTION LENS

CROSS-REFERENCE TO RELATED APPLICATION

This application is a continuation application of International Application No. PCT/JP2019/043326, filed Nov. 5, 2019, the disclosure of which is incorporated herein by reference in its entirety. Further, this application claims priority from Japanese Patent Application No. 2018-207733 filed Nov. 2, 2018, the disclosure of which is incorporated herein by reference in their entirety.

BACKGROUND OF THE INVENTION

Field of the Invention

The technology of the present disclosure relates to a projection lens.

Description of the Related Art

Projectors, which are projection apparatuses that project an image onto a screen, are widespread. A projector includes, for example, an image forming panel (hereafter, referred to as an "electro-optical device"), such as a liquid crystal display (LCD) device or a digital micromirror device (DMD, registered trademark), and a projection lens that projects an image formed by the image forming panel onto a screen.

Among such projectors, a projector including a projection lens that can change an image projection direction has been developed (see WO2018/055964). In the projector described in WO2018/055964, the image forming panel is accommodated in a body portion, and the projection lens is attached an outer peripheral surface of the body portion.

In the projector described in WO2018/055964, a light beam that represents an image formed by the image forming panel is incident on the projection lens from the body portion. The projection lens includes a bending optical system having three optical axes that are a first optical axis, a second optical axis, and a third optical axis in order from the incident side. The first optical axis is an optical axis corresponding to a light beam that is incident from the body portion, and the second optical axis is bent at 90° with respect to the first optical axis. The third optical axis is bent at 90° with respect to the second optical axis, and is an emission optical axis along which a light beam is emitted toward a screen.

The projection lens has an incident-side end portion, an intermediate portion, and an emission-side end portion. The incident-side end portion corresponds to the first optical axis. The intermediate portion corresponds to the second optical axis. The emission-side end portion corresponds to the third optical axis. The incident-side end portion is unrotatably attached to the body portion, and the intermediate portion rotates around the first optical axis relative to the incident-side end portion. The emission-side end portion is coupled to the intermediate portion, and, when the intermediate portion rotates, the emission-side end portion also rotates around the first optical axis. Moreover, the emission-side end portion rotates around the second optical axis relative to the intermediate portion. As the emission-side end portion rotates around the first optical axis and the second optical axis in this way, the projection direction is changed.

SUMMARY OF THE INVENTION

A zoom optical system, which includes a plurality of lenses, is provided on the incident side of the projection lens. It is known that the zoom optical system is generally heavier than a focus optical system. When the plurality of lenses included in the zoom optical system are arranged in the vertical direction, as the number of lenses included in the zoom optical system increases, the weight effect that a holding portion, which holds the zoom optical system, receives from the zoom optical system increases.

One embodiment of the present invention provides a projection lens that can reduce the weight effect received from the zoom optical system, compared with a case where the arrangement direction of the plurality of lenses included in the zoom optical system is constantly fixed to the vertical direction.

A projection lens according to a first aspect of the technology of the present disclosure, which is a projection lens to be attached to a projection apparatus body having an electro-optical device, includes: a zoom optical system including a plurality of lenses; a first holding portion that is to be connected to the projection apparatus body and through which light along a first optical axis passes; and a second holding portion through which light along a second optical axis, which is bent with respect to the first optical axis, passes and that is rotatable relative to the first holding portion. The zoom optical system is held by the first holding portion.

Accordingly, the projection lens according to the first aspect of the technology of the present disclosure can reduce the weight effect received from the zoom optical system, compared with a case where the arrangement direction of the plurality of lenses included in the zoom optical system is constantly fixed to the vertical direction.

In a projection lens according to a second aspect of the technology of the present disclosure, the projection lens forms an intermediate image in the projection lens and emits the intermediate image that has been formed, and the zoom optical system is on an upstream side of an image forming position of the intermediate image in an optical path.

Accordingly, the projection lens according to the second aspect of the technology of the present disclosure can reduce the size of the zoom optical system, compared with a case where light is emitted from the projection lens without forming an intermediate image in the projection lens.

A projection lens according to a third aspect of the technology of the present disclosure includes a focus optical system, and a third holding portion through which light along a third optical axis, which is bent with respect to the second optical axis, passes and that is rotatable relative to the second holding portion. The focus optical system is held by the third holding portion.

Accordingly, the projection lens according to the third aspect of the technology of the present disclosure can reduce the weight effect received from the focus optical system, compared with a case where the optical axis of the focus optical system is constantly arranged in the vertical direction.

In a projection lens according to first aspect of the technology of the present disclosure, the second holding portion has an intermediate optical system, and a diameter of a lens that constitutes the zoom optical system is smaller than a diameter of a lens that constitutes the intermediate optical system.

Accordingly, the projection lens according to the fourth aspect of the technology of the present disclosure can reduce the weight effect received from the zoom optical system, compared with a case where the diameter of a lens that constitutes the zoom optical system is greater than or equal to the diameter of a lens that constitutes the intermediate optical system.

A projection lens according to a fifth aspect of the technology of the present disclosure includes a zoom mechanism that is connected to a motor and that changes a zoom ratio of the zoom optical system by being provided with motive force of the motor.

Accordingly, the projection lens according to the fifth aspect of the technology of the present disclosure can reduce the weight effect received from the zoom optical system by using rotation restraining force of the motor when driving of the motor is stopped, compared with a case where the zoom ratio of the zoom optical system is changed without using the motor.

A projection lens according to a sixth aspect of the technology of the present disclosure includes an aperture stop portion provided in the first holding portion, and a first lens disposed on an upstream side of the aperture stop portion in an optical path. The projection lens is movable in an in-plane direction of an attachment surface at which the projection lens is attached to the projection apparatus body. An inside diameter of the aperture stop portion is smaller than a diameter of the first lens.

Accordingly, the projection lens according to the sixth aspect of the technology of the present disclosure can allow light having telecentricity to pass therethrough even when the projection lens moves in the in-plan direction of an attachment surface at which the projection lens is attached to the projection apparatus body.

In a projection lens according to a seventh aspect of the technology of the present disclosure, the aperture stop portion is a diaphragm lens, and the zoom optical system includes the diaphragm lens.

Accordingly, the projection lens according to the seventh aspect of the technology of the present disclosure can contribute to reduction in size of the projection lens, compared with a case where a diaphragm lens is present outside of zoom optical system.

A projection lens according to an eighth aspect of the technology of the present disclosure includes an adjustment frame that holds the first lens. The adjustment frame is movable relative to the first holding portion in a direction in which the first optical axis extends.

Accordingly, the projection lens according to the eighth aspect of the technology of the present disclosure can adjust the in-focus position on the reduction side of the projection lens.

With one embodiment of the present invention, the weight effect received from the zoom optical system can be reduced, compared with a case where the arrangement direction of the plurality of lenses included in the zoom optical system is constantly fixed to the vertical direction.

DESCRIPTION OF THE PREFERRED EMBODIMENTS

Hereafter, an example of an embodiment of the technology of the present disclosure will be described with reference to the drawings.

Terms such as "first", "second", and "third" used in the present specification are attached in order to avoid confusion among constituent elements and do not limit the number of constituent elements that exist in a projector or a lens.

Figure 1:
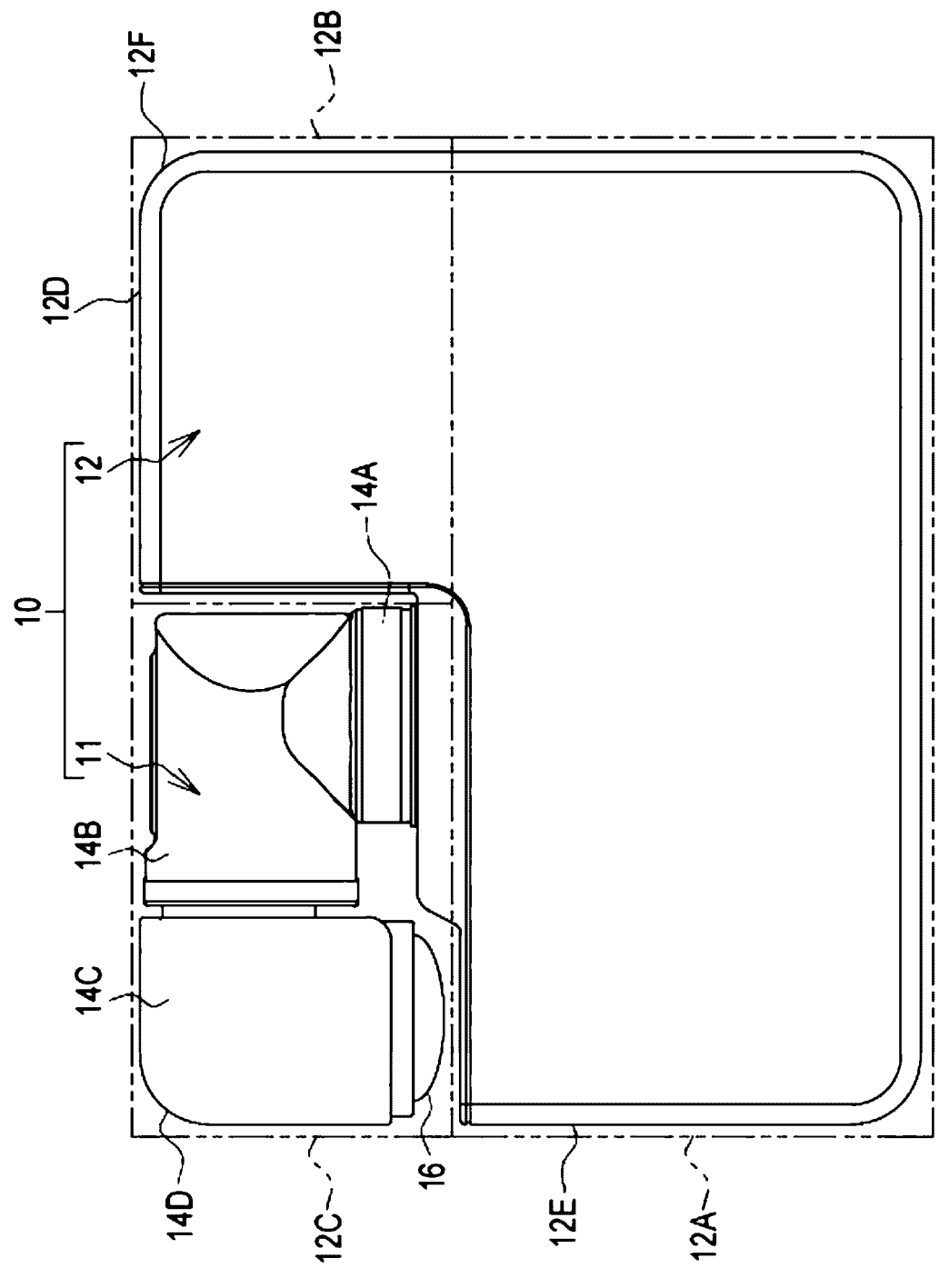
FIG. 1 is a plan view of a projector.

As illustrated in FIG. 1, a projector 10 according to the present embodiment is an example of a "projection apparatus" according to the technology of the present disclosure, and includes a projection lens 11 and a body portion 12. The body portion 12 is an example of a "projection apparatus body" according to the technology of the present disclosure. One end portion of the projection lens 11 is attached to the body portion 12. FIG. 1 illustrates a retracted state in which the projection lens 11 is retracted when the projector 10 is not used.

The body portion 12 includes a base portion 12A, a protruding portion 12B, and a retraction portion 12C. The base portion 12A accommodates main components, such as an image forming unit 26 (see FIG. 4) and a control circuit board (not shown). The image forming unit 26 is an example of an "electro-optical device" according to the technology of the present disclosure.

The base portion 12A has a horizontally-elongated substantially rectangular shape in a plan view shown in FIG. 1. An insertion opening 12A1 (see FIGS. 6, 10, and 11) is formed in the base portion 12A, and a focus adjustment tube 41E (see FIG. 6 and FIGS. 8 to 11) described below is inserted into the base portion 12A through the insertion opening 12A1.

The protruding portion 12B protrudes from one side of the base portion 12A. The protruding portion 12B has a substantially rectangular shape, and the width of the protruding portion 12B is approximately a half of the length of the one side of the base portion 12A. Therefore, the entirety of the body portion 12, in which the base portion 12A and the protruding portion 12B are combined, is substantially L-shaped in plan view.

The retraction portion 12C allows the projection lens 11 to be retracted. In FIG. 1, the retraction portion 12C is a space formed on the left side of the protruding portion 12B, and has a substantially rectangular shape in plan view, as with the protruding portion 12B. That is, in FIG. 1, it is assumed that, among outer peripheral surfaces of the body portion 12, a side surface 12D on the upper side and a side surface 12E on the left side are extended in directions such that the side surface 12D and the side surface 12E intersect each other. The retraction portion 12C is a space that is defined with the extended side surface 12D and the extended side surface 12E as outer edges. Therefore, the body portion 12, which is substantially L-shaped as a unit, has a substantially rectangular shape in plan view as an entirety including the retraction portion 12C. The retraction portion 12C corresponds to a recessed portion, because the retraction portion 12C can be regarded as a part that is recessed toward the base portion 12A relative to the height of the protruding portion 12B when the projector 10 is placed in a vertical position.

When the projector 10 is not used, the projection lens 11 is deformed so as not to protrude from the rectangular retraction portion 12C and then retracted into the retraction portion 12C. Therefore, as illustrated in FIG. 1, in the retracted state, the entirety of the projector 10, in which the L-shaped body portion 12 and the projection lens 11 are combined, has a substantially rectangular-parallelepiped shape, and has only a small number of depressions and protrusions on the outer peripheral surface thereof. Thus, in the retracted state, the projector 10 can be easily carried and stored.

A light beam that represents an image formed by the image forming unit 26 is incident on the projection lens 11 from the body portion 12. The projection lens 11 magnifies image light based on the incident light beam and forms an image by using an optical system. Thus, the projection lens 11 projects onto a screen 36 a magnified image of the image formed by the image forming unit 26 (see FIG. 4). Hereafter, for convenience of description, on the optical axis of the projection lens 11, the image forming unit 26 side will be referred to as the "reduction side" and the screen side will be referred to as the "magnification side".

The projection lens 11 has, for example, a bending optical system (see FIGS. 2 and 3) that bends the optical axis twice, and, in the retracted state illustrated in FIG. 1, the entirety of the projection lens 11 has a substantially U-shape that is upwardly convex. The projection lens 11 includes an incident-side end portion 14A, an intermediate portion 14B, and an emission-side end portion 14C. The incident-side end portion 14A is connected to one of the two ends of the intermediate portion 14B, and the emission-side end portion 14C is connected to the other of the two ends of the intermediate portion 14B. Light from the body portion 12 is incident on the incident-side end portion 14A. An emission lens 16 is provided in the emission-side end portion 14C. Light that is incident on the incident-side end portion 14A from the body portion 12 is guided to the emission-side end portion 14C through the intermediate portion 14B. The emission-side end portion 14C emits light, which is guided from the body portion 12 through the incident-side end portion 14A and the intermediate portion 14B, from the emission lens 16 toward the screen 36.

The incident-side end portion 14A is attached to the body portion 12, and has a first holding portion (described below) inside thereof. The attachment position of the incident-side end portion 14A is a position that is adjacent to the protruding portion 12B in the left-right direction of FIG. 1, and is positioned near the center of the base portion 12A. In the retracted state of the projection lens 11, the intermediate portion 14B extends from a position near the center of the base portion 12A toward an end portion on a side opposite to the protruding portion 12B, that is, toward the left side in FIG. 1. The intermediate portion 14B has a second holding portion (described below) inside thereof. A corner portion 14D of the emission-side end portion 14C and a corner portion 12F of the protruding portion 12B are disposed at positions that are substantially symmetric in the left-right direction in FIG. 1. The emission-side end portion 14C has a third holding portion (described below) inside thereof.

The outer shape of the emission-side end portion 14C is substantially the same as the outer shape of the protruding portion 12B, and the outer shape of the projection lens 11 and the outer shape of the body portion 12 are provided with uniformity. Therefore, the projection lens 11 is designed so that, in the retracted state, the outer shape the projection lens 11 seems to constitute a part of the outer shape of the body portion 12.

Figure 2:
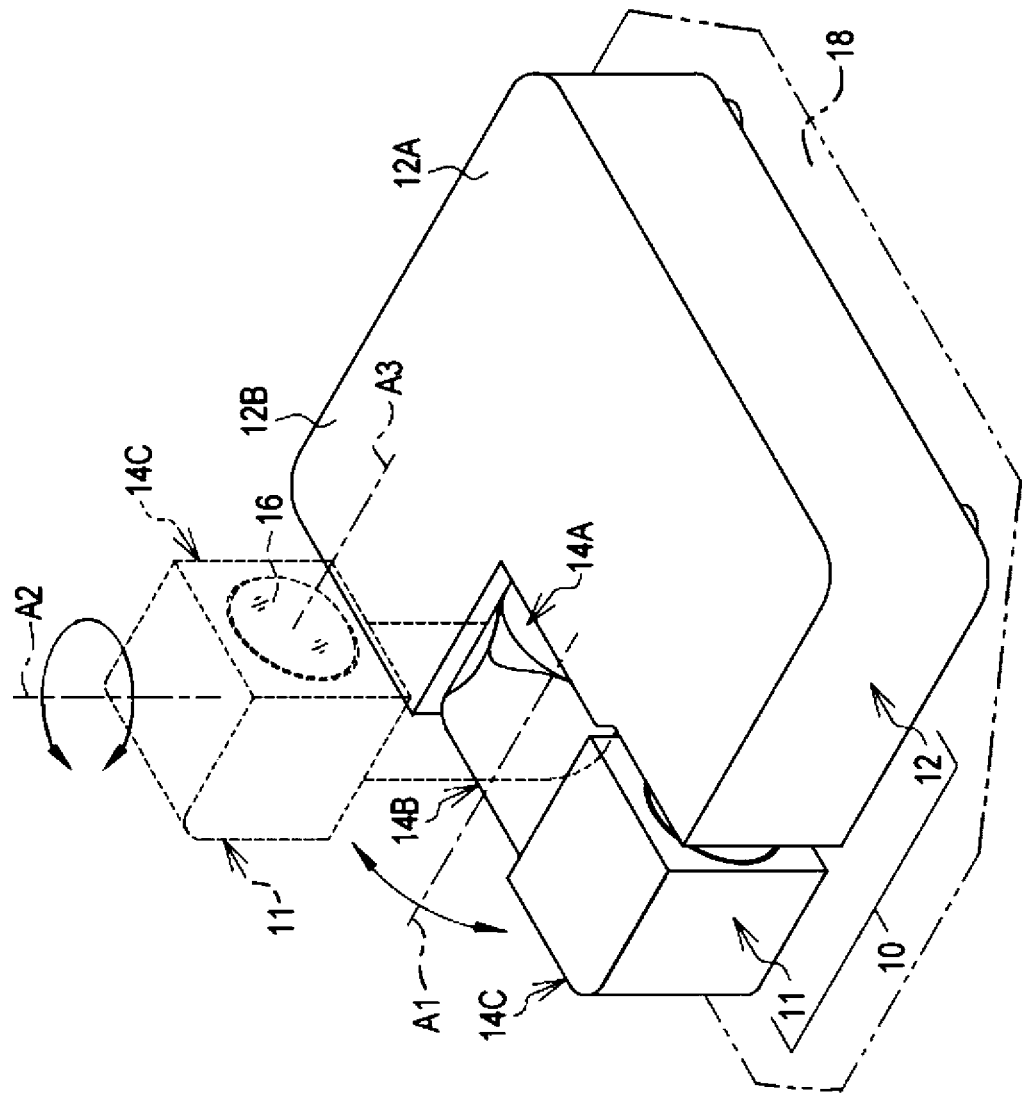
FIG. 2 is a perspective view of the projector placed in a horizontal position.
Figure 3:
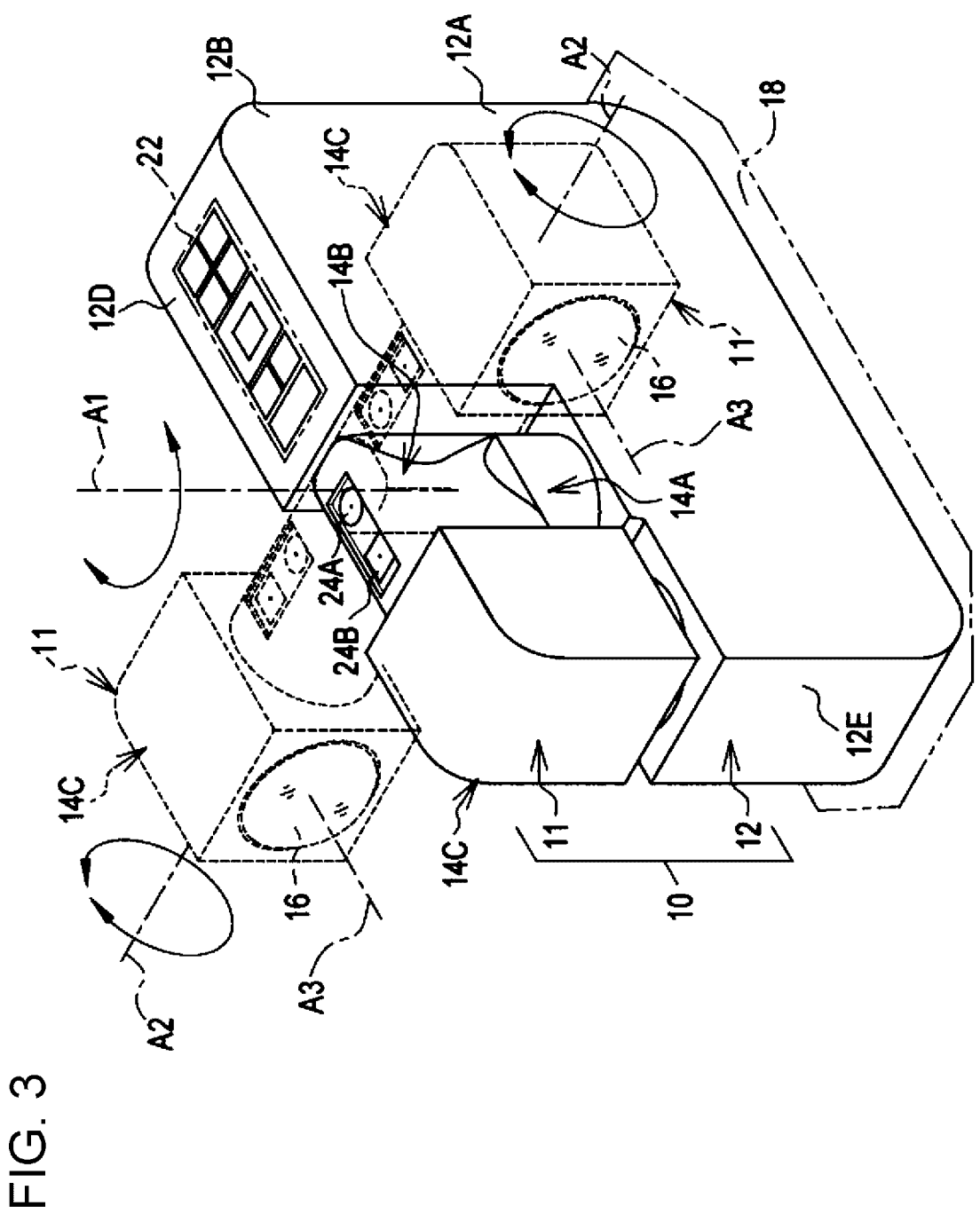
FIG. 3 is a perspective view of the projector placed in a vertical position.

As illustrated in FIGS. 2 and 3, the projection lens 11 includes a bending optical system. The bending optical system has a first optical axis A1, a second optical axis A2, and a third optical axis A3. The second optical axis A2 is an optical axis that is bent at 90° with respect to the first optical axis A1. The third optical axis A3 is an optical axis that is bent at 90° with respect to the second optical axis A2.

The incident-side end portion 14A is unrotatably attached to the body portion 12. The intermediate portion 14B is rotatable around the first optical axis A1 relative to the incident-side end portion 14A. Because the emission-side end portion 14C is coupled to the intermediate portion 14B, when the intermediate portion 14B rotates relative to the incident-side end portion 14A, the emission-side end portion 14C also rotates around the first optical axis A1. The rotatable range around the first optical axis A1 is less than 360°, and is 180° in the present example. The rotatable range around the first optical axis A1 is limited to less than 360° in order to prevent interference between the protruding portion 12B and the projection lens 11 in the state in which the protruding portion 12B is adjacent to the incident-side end portion 14A.

The emission-side end portion 14C is rotatable around the second optical axis A2 relative to the intermediate portion 14B. In contrast to the intermediate portion 14B, there is no limitation on the rotation of the emission-side end portion 14C around the second optical axis A2. For example, it is possible to rotate the emission-side end portion 14C by 360° or more.

In summary, the emission-side end portion 14C is rotatable with two axes, which are the first optical axis A1 and the second optical axis A2, as rotation axes. Thus, a user can change the projection direction of the projection lens 11 without moving the body portion 12.

FIG. 2 illustrates a state in which the projector 10 is placed in a horizontal position on a placement surface 18, and FIG. 3 illustrates a state in which the projector 10 is placed in a vertical position on the placement surface 18. In this way, the projector 10 can be used in a horizontal position and in a vertical position.

As illustrated in FIG. 3, an operation panel 22 is provided in the side surface 12D of the protruding portion 12B. The operation panel 22 has a plurality of operation switches. The operation switches are, for example, an electric power switch, adjustment switches, and the like. The adjustment switches are switches for performing various adjustments. The adjustment switches include, for example, switches for performing image-quality adjustment and keystone correction of an image projected onto the screen 36.

A first unlock switch 24A and a second unlock switch 24B are provided in one surface of the intermediate portion 14B. As described below, a first rotation rock mechanism (not shown) and a second rotation rock mechanism (not shown) are provided in the projection lens 11. The first rotation rock mechanism locks the rotation of the intermediate portion 14B around the first optical axis A1 relative to the incident-side end portion 14A. The second rotation rock mechanism locks the rotation of the emission-side end portion 14C around the second optical axis A2 relative to the intermediate portion 14B. The first unlock switch 24A is an operation switch that inputs to the first rotation rock mechanism an instruction for unlocking the rotation of the intermediate portion 14B. The second unlock switch 24B is an operation switch that inputs to the second rotation rock mechanism an instruction for unlocking the rotation of the emission-side end portion 14C.

Figure 4:
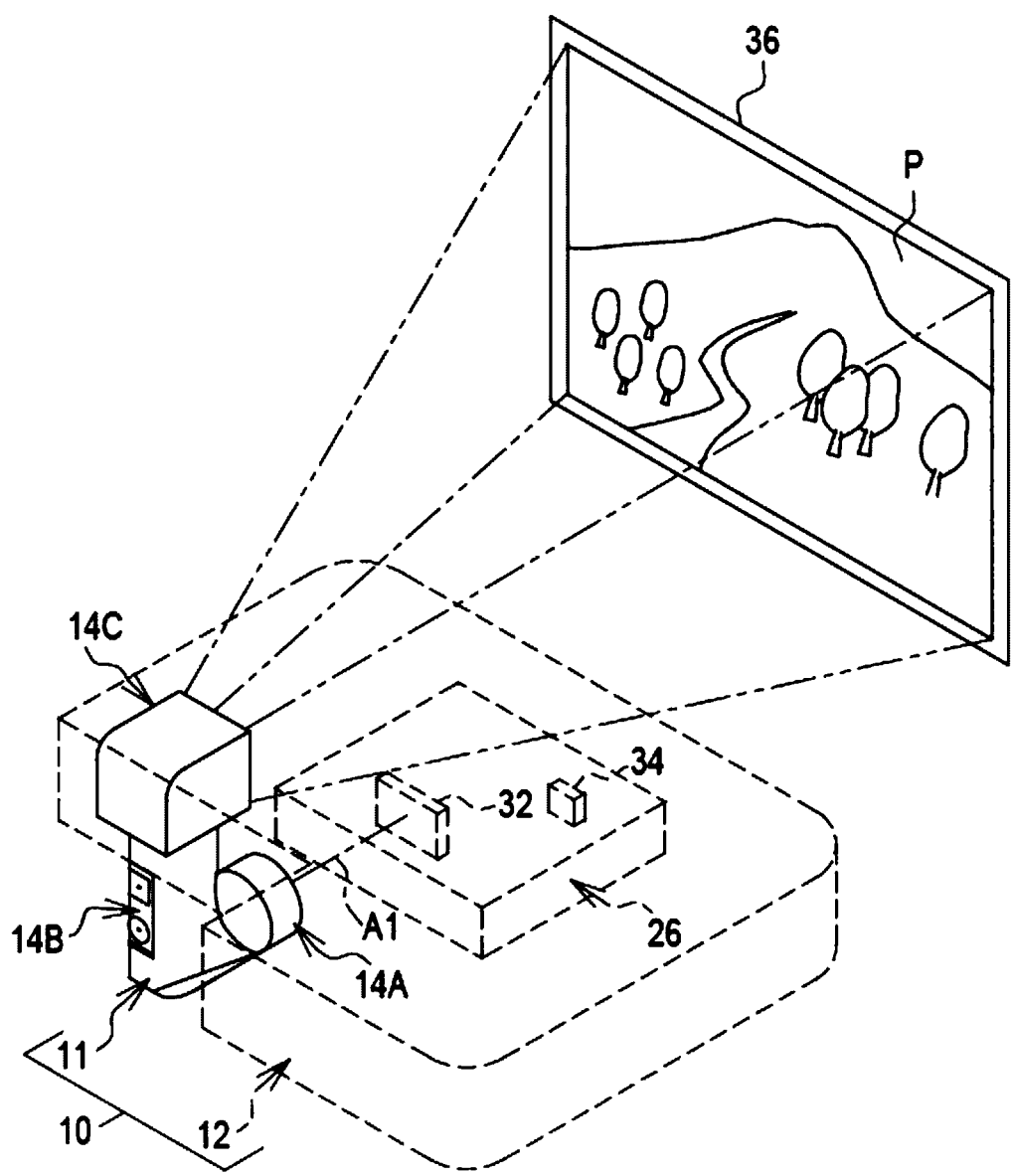
FIG. 4 illustrates a state in which an image is being projected onto a screen by using the projector.

As illustrated in FIG. 4, the image forming unit 26 is provided in the body portion 12. The image forming unit 26 forms an image to be projected. The image forming unit 26 includes an image forming panel 32, a light source 34, a light guide member (not shown), and the like. The light source 34 irradiates the image forming panel 32 with light. The light guide member guides light from the light source 34 to the image forming panel 32. The image forming unit 26 is, for example, a reflective image forming unit that uses a DMD as the image forming panel 32. As is well known, the DMD is an image display element that has a plurality of micromirrors, each of which can change the reflection direction of light emitted from the light source 34, and in which the micromirrors are two-dimensionally arranged by pixels. The DMD performs light modulation accordance to an image by switching between on and off of reflected light of light from the light source 34 by changing the direction of each micromirror in accordance with the image.

An example of the light source 34 is a white light source. The white light source emits white light. The white light source is a light source that is realized, for example, by combining a laser light source and a fluorescent body. The laser light source emits blue light as excitation light toward the fluorescent body. The fluorescent body emits yellow light by being excited by the blue light emitted from the laser light source. The white light source emits white light by combining the blue light emitted from the laser light source and the yellow light emitted from the fluorescent body. Moreover, in the image forming unit 26, a rotatable color filter, which selectively converts white light, emitted by the light source 34, into blue light B (Blue), green light G (Green), and red light R (Red) in a time-division manner, is provided. The image forming panel 32 is selectively irradiated with the blue light B, the green light G, and the red light R, and thereby image light respectively having image information of the colors B, G, and R is obtained. Image light of each color, which is obtained in this way, is selectively incident on the projection lens 11, and thereby the image light is projected onto the screen 36. Image light of each color is integrated on the screen 36, and a full-color image P is displayed on the screen 36.

Figure 5:
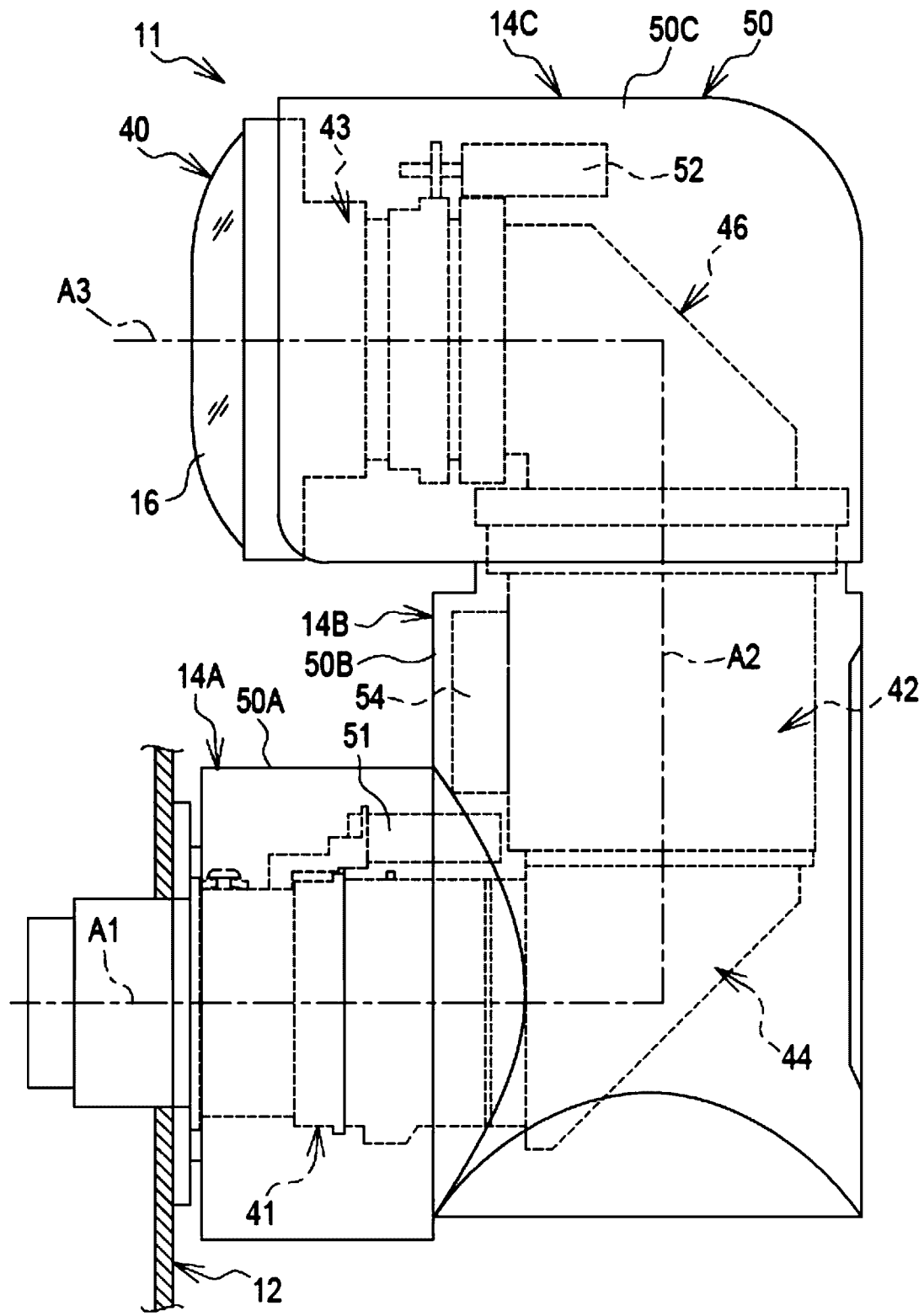
FIG. 5 is a side view of a projection lens.
Figure 6:
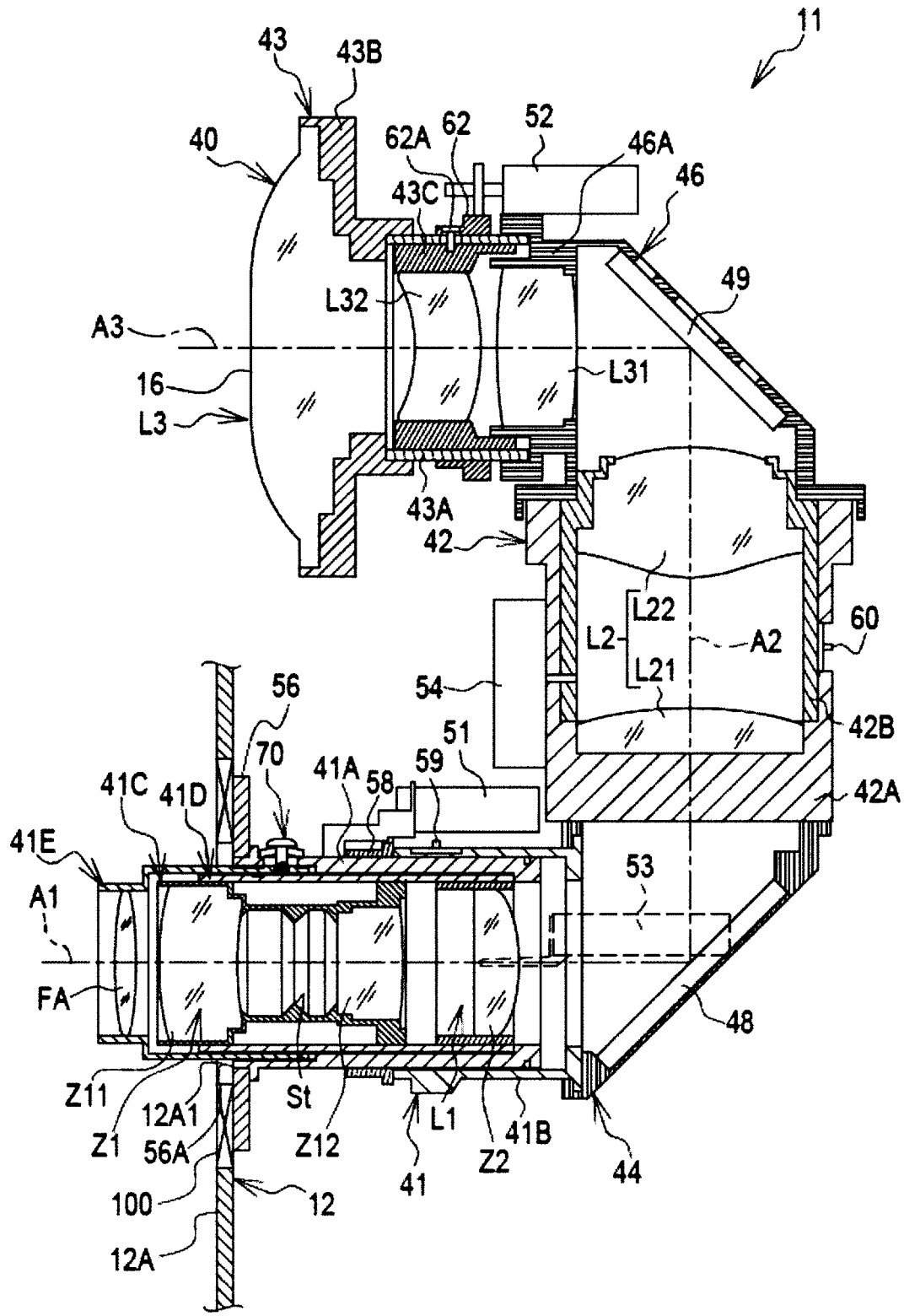
FIG. 6 is a longitudinal sectional view of the projection lens.

As illustrated in FIGS. 5 and 6, the projection lens 11 includes a lens barrel 40. The lens barrel 40 accommodates the bending optical system. The lens barrel 40 includes a first lens barrel portion 41, a second lens barrel portion 42, a third lens barrel portion 43, and the focus adjustment tube 41E. Here, the first lens barrel portion 41 is an example of a "first holding portion" according to the technology of the present disclosure. A first mirror holding portion 44 and a part of the second lens barrel portion 42 are an example of a "second holding portion" according to the technology of the present disclosure. A second mirror holding portion 46 and the third lens barrel portion 43 are an example of a "third holding portion" according to the technology of the present disclosure. Moreover, the focus adjustment tube 41E is an example of an "adjustment frame" according to the technology of the present disclosure. The first holding portion, the second holding portion, and the third holding portion hold various constituent elements of the projection lens 11. Here, examples of the various constituent elements include at least one or more of various optical systems, reflection portions, electric drive portions, and the like. The second holding portion, including a part of the second lens barrel portion 42, rotates relative to the first holding portion, including the first lens barrel portion 41; and the third holding portion, including the third lens barrel portion 43, rotates relative to the second holding portion.

Each of the first lens barrel portion 41, the second lens barrel portion 42, and the third lens barrel portion 43 accommodates lenses. The lenses accommodated in the first lens barrel portion 41 are arranged on the first optical axis A1. The lenses accommodated in the second lens barrel portion 42 are arranged on the second optical axis A2. The lenses accommodated in the third lens barrel portion 43 are arranged on the third optical axis A3. The central axis of the first lens barrel portion 41 substantially coincides with the first optical axis A1. The central axis of the second lens barrel portion 42 substantially coincides with the second optical axis A2. The central axis of the third lens barrel portion 43 substantially coincides with the third optical axis A3. FIGS. 5 and 6 illustrate the lens barrel 40 in the state illustrated in FIGS. 2 and 4. Although each lens is represented as one lens while omitting detailed configuration thereof for simplicity of description in the present embodiment, the technology of the present disclosure is not limited this, and each lens may include a plurality of lenses.

The first lens barrel portion 41 is a lens barrel portion that is positioned furthest on the incident side, the third lens barrel portion 43 is a lens barrel portion that is positioned furthest on the emission side, and the first lens barrel portion 41 is connected to the body portion 12 and allows light along the first optical axis A1 to pass therethrough. The second lens barrel portion 42 is a lens barrel portion that is positioned between the first lens barrel portion 41 and the third lens barrel portion 43. A part of the second lens barrel portion 42 allows light along the second optical axis A2 to pass therethrough, and is rotatable relative to the first lens barrel portion 41.

Moreover, the lens barrel 40 includes the first mirror holding portion 44 and the second mirror holding portion 46. The first mirror holding portion 44 holds a first mirror 48, and the second mirror holding portion 46 holds a second mirror 49. The first mirror 48 and the second mirror 49 are each one of optical elements that constitute the bending optical system and a reflection portion that bends an optical axis. The first mirror 48 forms the second optical axis A2 by bending the first optical axis A1. The second mirror 49 forms the third optical axis A3 by bending the second optical axis A2. The first mirror holding portion 44 is disposed between the first lens barrel portion 41 and the second lens barrel portion 42. The second mirror holding portion 46 is disposed between the second lens barrel portion 42 and the third lens barrel portion 43.

An end portion of an inner tube 42B of the second lens barrel portion 42 and a lens L22 held by the end portion protrude into of the second mirror holding portion 46. Thus, the distance between the lens L22 and the second mirror 49 is reduced, and the second mirror 49 can reflect light from the lens L22 even if the size of the second mirror 49 is reduced. In addition to reduction of the size of the second mirror 49, the size of the second mirror holding portion 46 can be also reduced.

The lens barrel 40, excluding a part of the emission lens 16 and the like, is covered by an outer cover 50. The outer cover 50 has a first outer cover 50A, a second outer cover 50B, and a third outer cover 50C. The first outer cover 50A is an outer cover corresponding to the incident-side end portion 14A, the second outer cover 50B is an outer cover corresponding to the intermediate portion 14B, and the third outer cover 50C is an outer cover corresponding to the emission-side end portion 14C.

The first outer cover 50A covers the first lens barrel portion 41 and constitutes an outer peripheral surface of the incident-side end portion 14A. The second outer cover 50B mainly covers the first mirror holding portion 44 and the second lens barrel portion 42 and constitutes an outer peripheral surface of the intermediate portion 14B. The third outer cover 50C mainly covers the second mirror holding portion 46 and the third lens barrel portion 43 and constitutes an outer peripheral surface of the emission-side end portion 14C.

Various actuators are disposed on an outer peripheral surface of the lens barrel 40. To be specific, a zooming motor 51 is provided on the outer peripheral surface of the first lens barrel portion 41, and a focusing motor 52 is provided on the outer peripheral surface of the second mirror holding portion 46. A solenoid 53 (see FIG. 6) is provided on the outer peripheral surface of the first mirror holding portion 44, and a solenoid 54 is provided on the outer peripheral surface of the second lens barrel portion 42. The zooming motor 51, the focusing motor 52, the solenoid 53, and the solenoid 54 are an example of an electric drive portion.

In FIG. 6, the first lens barrel portion 41 includes an inner tube 41A, an outer tube 41B, a zoom lens barrel 41C, and a cam tube 41D. The focus adjustment tube 41E is removably attached to the first lens barrel portion 41.

In the first lens barrel portion 41, a flange 56, which protrudes outward in the radial direction of the inner tube 41A, is provided at the incident-side end portion of the inner tube 41A in the first optical axis A1. The flange 56 is used to connect the first lens barrel portion 41 to the body portion 12. That is, as the flange 56 is fixed to the body portion 12 by using a two-dimensional shift mechanism 100 (described below), the first lens barrel portion 41 is coupled to the body portion 12. The outer tube 41B is disposed on the emission side of the inner tube 41A, and covers a part of the outer peripheral surface the inner tube 41A. The outer tube 41B is attached to the inner tube 41A in such a way that the outer tube 41B is rotatable around the first optical axis A1.

The two-dimensional shift mechanism 100 is provided in the base portion 12A of the body portion 12. The two-dimensional shift mechanism 100 is a shift mechanism that can move the flange 56 in the in-plane direction of the attachment surface. Here, the term "attachment surface" refers to a surface at which the flange 56 is attached to the two-dimensional shift mechanism 100, that is, a surface at which the flange 56 and the two-dimensional shift mechanism 100 are in contact with each other. The configuration of the two-dimensional shift mechanism 100 is publicly known and disclosed, for example, in JP2009-186527A and JP2011-158658A. The two-dimensional shift mechanism 100, which two-dimensionally shifts the projection lens 11, is an example of means for changing the incident position of incident light from the body portion 12 of the projection lens 11.

The first lens barrel portion 41 holds a first optical system L1. The first optical system L1 is constituted by, for example, a lens FA, a lens group Z1, and a lens Z2; and is disposed on the first optical axis A1. The lens group Z1 is constituted by a lens Z11 and a lens Z12. The cam tube 41D and the zoom lens barrel 41C are accommodated in the inner tube 41A. The zoom lens barrel 41C holds zoom lenses of two groups. The zoom lenses of two groups are positioned between the focus adjustment tube 41E and a lens L32 (described below) in the optical path. The zoom lenses of two groups are an example of a "zoom optical system" according to the technology of the present disclosure, and are constituted by the lens group Z1 and the lens Z2.

The cam tube 41D is an example of a "zoom mechanism" according to the technology of the present disclosure, and changes the zoom ratio due to the lens group Z1 and the lens Z2 by being provided with motive force of the zooming motor 51. A first cam groove (not shown) and a second cam groove (not shown) are formed in the cam tube 41D. The first cam groove is a cam groove for moving the lens group Z1. The second cam groove is a cam groove for moving the lens Z2. A first cam pin (not shown) is provided on a lens holding frame of the lens group Z1. A second cam pin (not shown) is provided on a lens holding frame of the lens Z2. The first cam pin is inserted into the first cam groove, and the second cam pin is inserted into the second cam groove.

When the cam tube 41D rotates around the first optical axis A1, the lens group Z1 moves along the first cam groove along the first optical axis A1, and the lens Z2 moves along the second cam groove along the first optical axis A1. When the lens group Z1 and the lens Z2 move along the first optical axis A1 in this way, the position of the lens group Z1 on the first optical axis changes, the position of the lens Z2 on the first optical axis A1 changes, and the distance between the lens group Z1 and the lens Z2 changes. Thus, zooming is performed, and the zoom ratio due to the lens group Z1 and the lens Z2 is changed.

The zooming motor 51 is connected the cam tube 41D, and the cam tube 41D rotates by being driven by the zooming motor 51. A gear 58 having a cylindrical shape is provided on the outside of the inner tube 41A. The gear 58 rotates around the inner tube 41A by being driven by the zooming motor 51. A drive pin (not shown) for rotating the cam tube 41D is provided on the gear 58. When the gear 58 rotates, the drive pin also rotates in the circumferential direction of the inner tube 41A, and the cam tube 41D rotates in accordance with the rotation. In order to prevent interference with the drive pin, an insertion groove (not shown), which allows the drive pin to be inserted, is formed in the inner tube 41A in the circumferential direction.

In the zoom lens barrel 41C, a fixed aperture stop St is provided between the lens Z11 and the lens Z12. The fixed aperture stop St is an example of an "aperture stop portion" according to the technology of the present disclosure, and restricts a light beam that is incident from the body portion 12. By providing the fixed aperture stop St in the zoom lens barrel 41C, the reduction side relative to the lens FA can be made telecentric. Thus, it is possible to adapt to change in a light beam that is incident on the projection lens 11 by using the two-dimensional shift mechanism 100 or the like. Here, the term "telecentric" refers to optical characteristics such that the optical axis and the principal ray can be regarded to be parallel on the reduction side relative to the lens FA. Although an opening is used as the fixed aperture stop St here, the technology of the present disclosure is not limited to this, and a diaphragm lens may be used instead of the opening as the fixed aperture stop St. Instead of the fixed aperture stop St, a movable diaphragm may be used. Any aperture stop may be used, provided that the aperture stop can realize a telecentric optical system.

An opening 56A is formed in a central part of the flange 56. The shape of the opening 56A is a circular shape as seen from the first optical axis A1 side (see FIGS. 8 and 9). The focus adjustment tube 41E is attached to the incident-side end portion of the inner tube 41A through the opening 56A, and is rotatable around the first optical axis A1 relative to the inner tube 41A.

The focus adjustment tube 41E is disposed between the flange 56 and the zoom lens barrel 41C. The focus adjustment tube 41E holds the focus adjusting lens FA for adjusting the relative positions of the in-focus position on the reduction side of the projection lens 11 and the image forming panel 32. The lens FA is an example a "first lens" according to the technology of the present disclosure, and is an optical element that focuses an optical image.

When the projection lens 11 is attached to the body portion 12, the attachment position where the projection lens 11 is attached to the image forming panel 32 has an individual difference. The focus adjustment tube 41E is provided in order to absorb such an individual difference during manufacturing and to make the relative positions of the in-focus position on the reduction side of the projection lens 11 and the image forming panel 32 substantially uniform.

Figure 7:
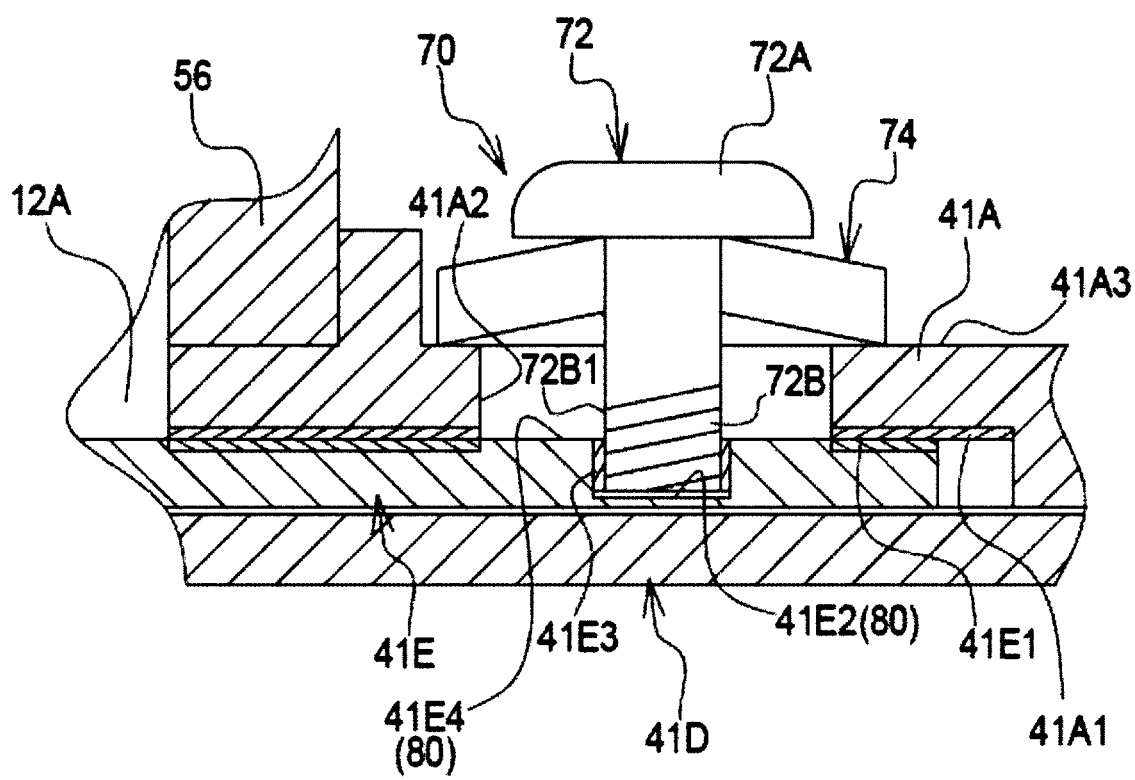
FIG. 7 is an enlarged view of a washer bolt, an elongated hole, and a region around the elongated hole.

As illustrated in FIG. 7, a screw groove 41E1 is formed in an outer peripheral surface of the emission-side end portion of the focus adjustment tube 41E. A screw groove 41A1 is formed in an inner peripheral surface of the inner tube 41A. The screw groove 41E1 and the screw groove 41A1 mesh with each other. Because the inner tube 41A is fixed to the body portion 12, when the focus adjustment tube 41E rotates relative to the inner tube 41A, the focus adjustment tube 41E moves along the first optical axis A1 due to the screw function of the screw groove 41A1 and the screw groove 41E1.

Figure 8:
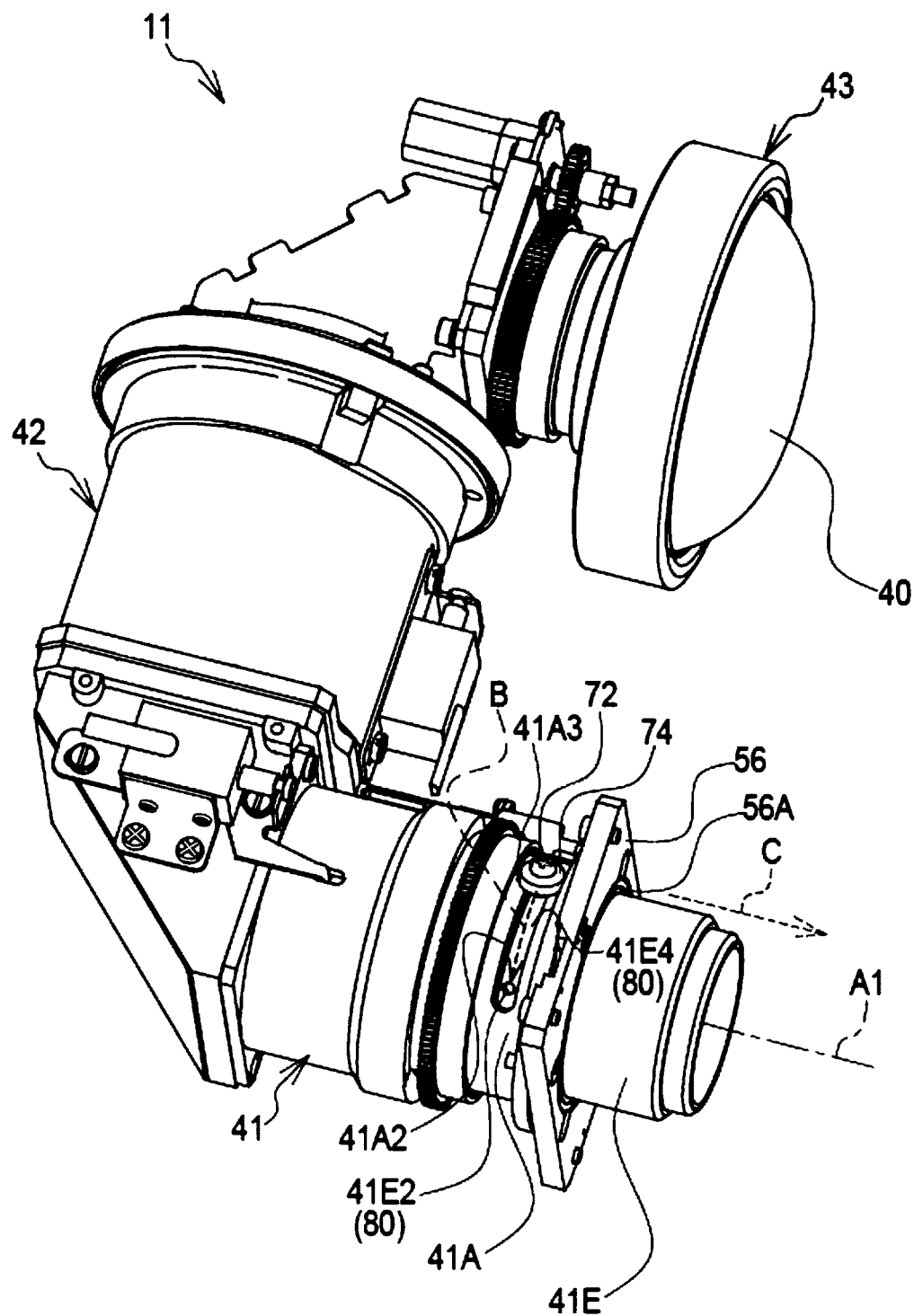
FIG. 8 is a perspective view of the projection lens in a state in which the washer bolt is positioned at one end in the longitudinal direction of the elongated hole.
Figure 9:
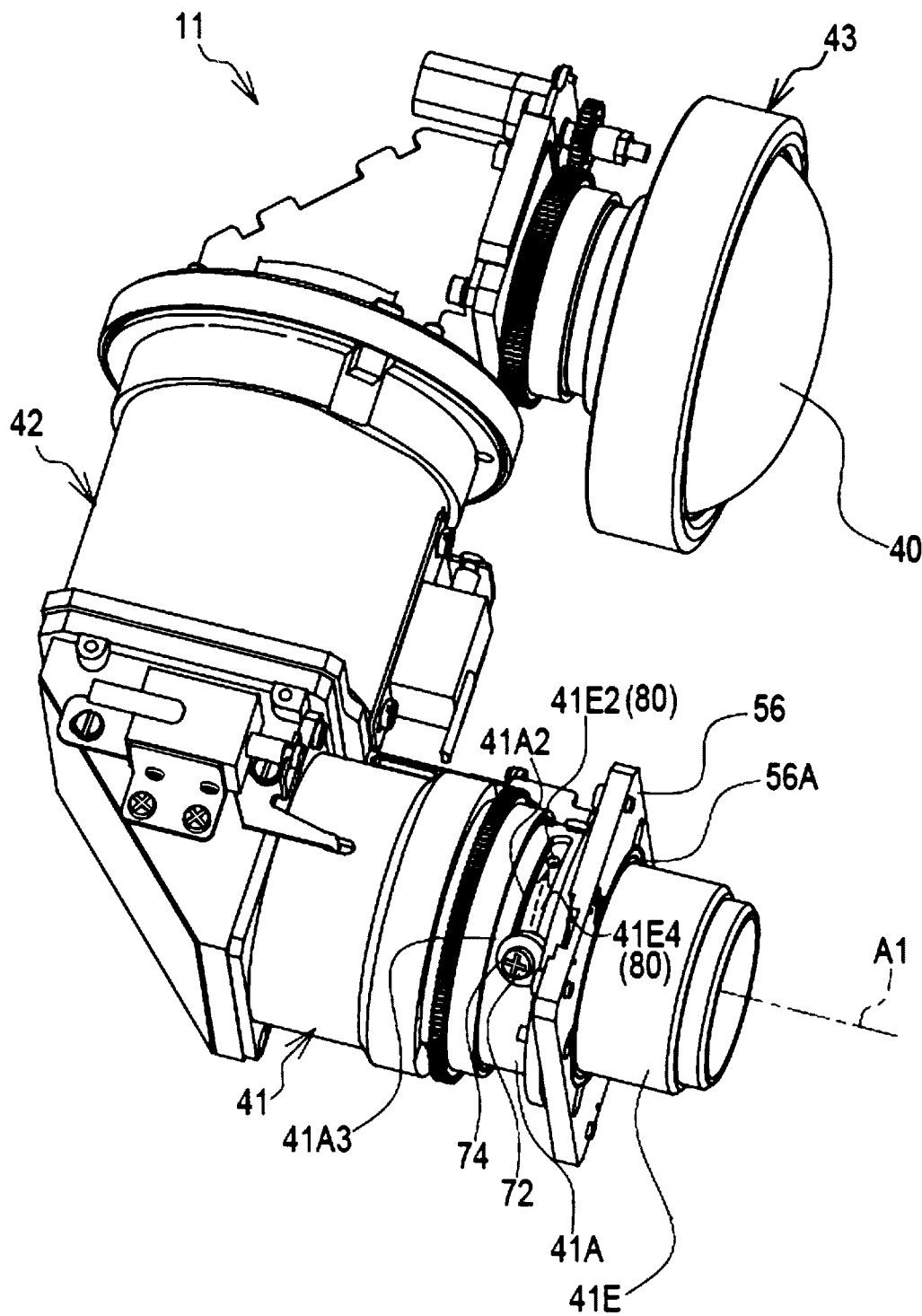
FIG. 9 is a perspective view of the projection lens in a state in which the washer bolt is positioned at the other end in the longitudinal direction of the elongated hole.

A plurality of elongated holes 41A2 are formed in the peripheral wall of the inner tube 41A. The plurality of elongated holes 41A2 are arranged at an interval in the circumferential direction of the inner tube 41A. The longitudinal direction of the elongated hole 41A2 in plan view of the elongated hole 41A2 is a direction corresponding to the circumferential direction of the inner tube 41A (FIGS. 8 and 9). The transversal direction of the elongated hole 41A2 in plan view of the elongated hole 41A2 is a direction corresponding to the direction of the rotation axis of the inner tube 41A (see FIGS. 8 and 9). When the focus adjustment tube 41E is attached to the incident-side end portion of the inner tube 41A through the opening 56A, a peripheral surface 41E4, which is at a position in the outer peripheral surface of the focus adjustment tube 41E corresponding to the position of the elongated hole 41A2, becomes exposed from the elongated hole 41A2.

The focus adjustment tube 41E includes an adjustment portion 80. The adjustment portion 80 is used to move the focus adjustment tube 41E in the first optical axis A1 direction (see FIGS. 8 and 9) relative to the first lens barrel portion 41. In the present embodiment, the peripheral surface 41E4 and a plurality of screw boxes 41E2 are used as an example of the adjustment portion 80. The peripheral surface 41E4 and the plurality of screw boxes 41E2 are positioned on the magnification side of the projection lens 11 relative to the flange 56.

The plurality of screw boxes 41E2 are formed in the peripheral surface 41E4. The plurality of screw boxes 41E2 are arranged at an interval in the circumferential direction of the focus adjustment tube 41E. The screw box 41E2 has a cylindrical shape with a bottom, and a screw groove 41E3 is formed in an inner peripheral surface of the screw box 41E2. When the focus adjustment tube 41E is attached to the incident-side end portion of the inner tube 41A through the opening 56A, the screw box 41E2 becomes exposed from the elongated hole 41A2 together with the peripheral surface 41E4.

The projection lens 11 includes a washer bolt 70. The washer bolt 70 is an example of a "fixing member" according to the technology of the present disclosure. The focus adjustment tube 41E is fixed to the inner tube 41A by using the washer bolt 70. This means that the focus adjustment tube 41E is fixed to the first lens barrel portion 41 by using the washer bolt 70. When the fixing force of the washer bolt 70 is reduced, the focus adjustment tube 41E becomes movable relative to the inner tube 41A. This means that the focus adjustment tube 41E becomes movable relative to the first lens barrel portion 41.

The washer bolt 70 includes a bolt 72 and a washer 74. The bolt 72 includes a head portion 72A and a screw portion 72B. The screw portion 72B is inserted into the washer 74.

The screw portion 72B is inserted into the screw box 41E2. A screw groove 72B1 of the screw portion 72B meshes with the screw groove 41E3 of the screw box 41E2. The outside diameter of the washer 74 is greater than the length of the elongated hole 41A2 in the transversal direction. First, the screw portion 72B is inserted into the screw box 41E2 through the elongated hole 41A2, and the screw portion 72B rotates relative to the screw box 41E2. Due to the rotation, the bolt 72 moves toward the bottom of the screw box 41E2 due to the screw function of the screw groove 72B1 of the screw portion 72B and the screw groove 41E3 of the screw box 41E2. When the bolt 72 moves toward the bottom of the screw box 41E2, shortly, the washer 74 comes into contact with a part of an outer peripheral surface 41A3 of the inner tube 41A at an outer edge part of the elongated hole 41A2.

Then, when the bolt 72 moves further toward the bottom of the screw box 41E2 in the state in which the washer 74 is in contact with the outer edge part of the elongated hole 41A2, the peripheral wall of the inner tube 41A becomes clamped between the washer 74 and the peripheral wall of the focus adjustment tube 41E. A force with which the washer 74 and the peripheral wall of the focus adjustment tube 41E clamp the peripheral wall of the inner tube 41A increases as the screw portion 72B is further screwed into the screw box 41E2. As the washer 74 and the peripheral wall of the focus adjustment tube 41E clamp the peripheral wall of the inner tube 41A in this way, the focus adjustment tube 41E and the inner tube 41A become integrated. Hereafter, for convenience of description, the force with which the washer 74 and the peripheral wall of the focus adjustment tube 41E clamp the peripheral wall of the inner tube 41A will be referred to as a "clamping force". Here, the "clamping force" is an example of a "fixing force" according to the technology of the present disclosure.

The clamping force decreases as the screw portion 72B is rotated in a rotation direction opposite to the rotation direction in which the screw portion 72B is rotated when the screw portion 72B is screwed into the screw box 41E2. As the clamping force gradually decreases, shortly, the washer bolt 70 becomes movable in the longitudinal direction of the elongated hole 41A2. Here, when the washer bolt 70 receives an external force in the longitudinal direction of the elongated hole 41A2 in a state in which the screw portion 72B is screwed into the screw box 41E2, the focus adjustment tube 41E rotates relative to the inner tube 41A. Thus, the focus adjustment tube 41E moves along the first optical axis A1 due to the screw function of the screw groove 41A1 and the screw groove 41E1.

For example, when the washer bolt 70 receives an external force in the arrow B direction as illustrated in FIG. 8 in a state in which the washer bolt 70 is positioned at one end side of the elongated hole 41A2 in the longitudinal direction, the focus adjustment tube 41E rotates relative to the inner tube 41A. Thus, the focus adjustment tube 41E moves toward the body portion 12 side along the first optical axis A1.

When the washer bolt 70 moves in the longitudinal direction of the elongated hole 41A2 from one end to the other end of the elongated hole 41A2 in the longitudinal direction, as illustrated in FIG. 9, another screw box 41E2 becomes exposed from the one end side of the elongated hole 41A2 in the longitudinal direction.

When the washer bolt 70 receives an external force in a direction opposite to the arrow B direction (see FIG. 8) in the state illustrated in FIG. 9, that is, in the state in which the washer bolt 70 is positioned at the other end side of the elongated hole 41A2 in the longitudinal direction, the focus adjustment tube 41E rotates relative to the inner tube 41A. Thus, the focus adjustment tube 41E moves along the first optical axis A1 toward a side opposite to the body portion 12 side.

Figure 10:
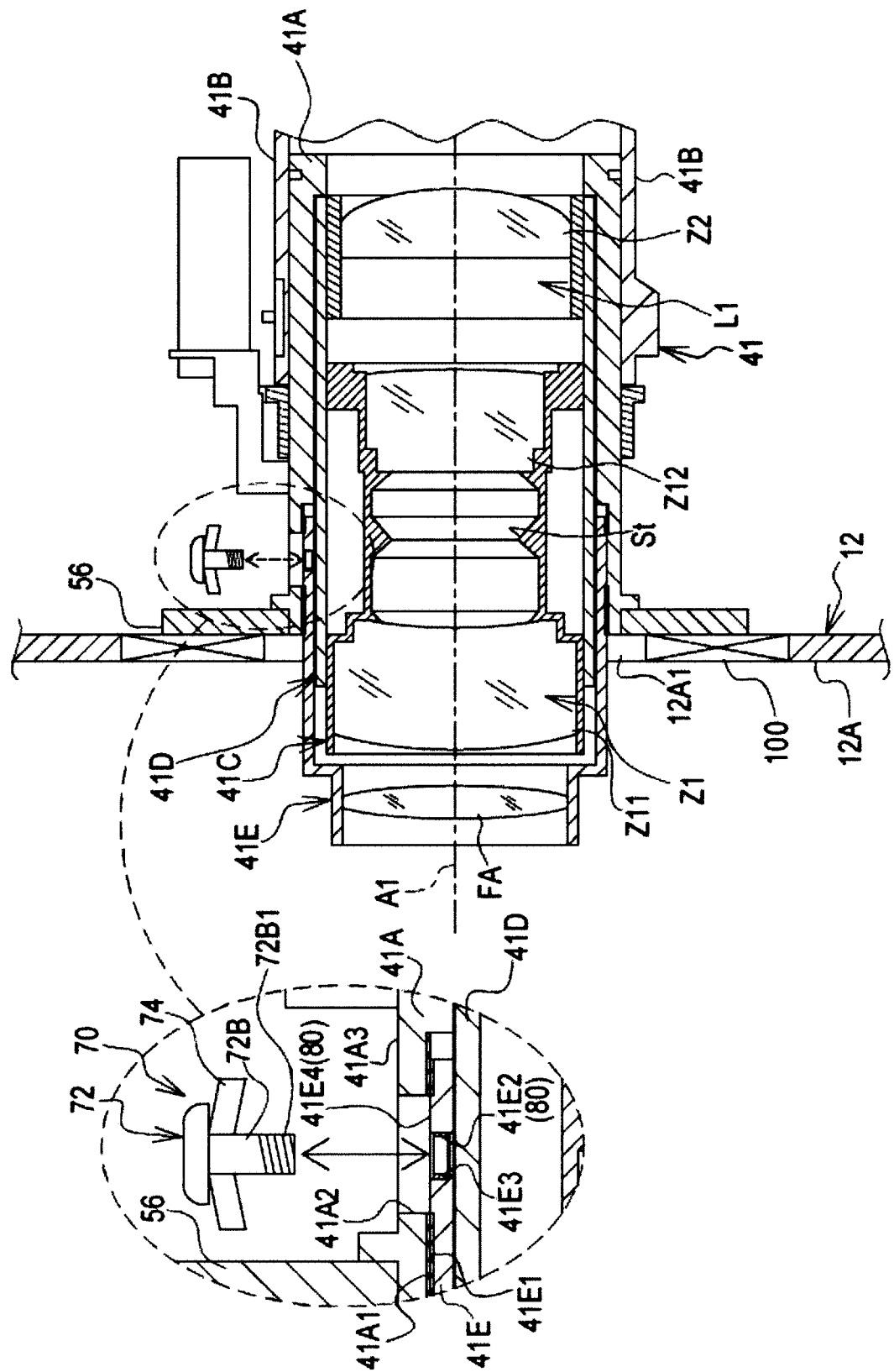
FIG. 10 is a longitudinal sectional view of the projection lens in a state in which the washer bolt is removed from a screw box and the elongated hole.
Figure 11:
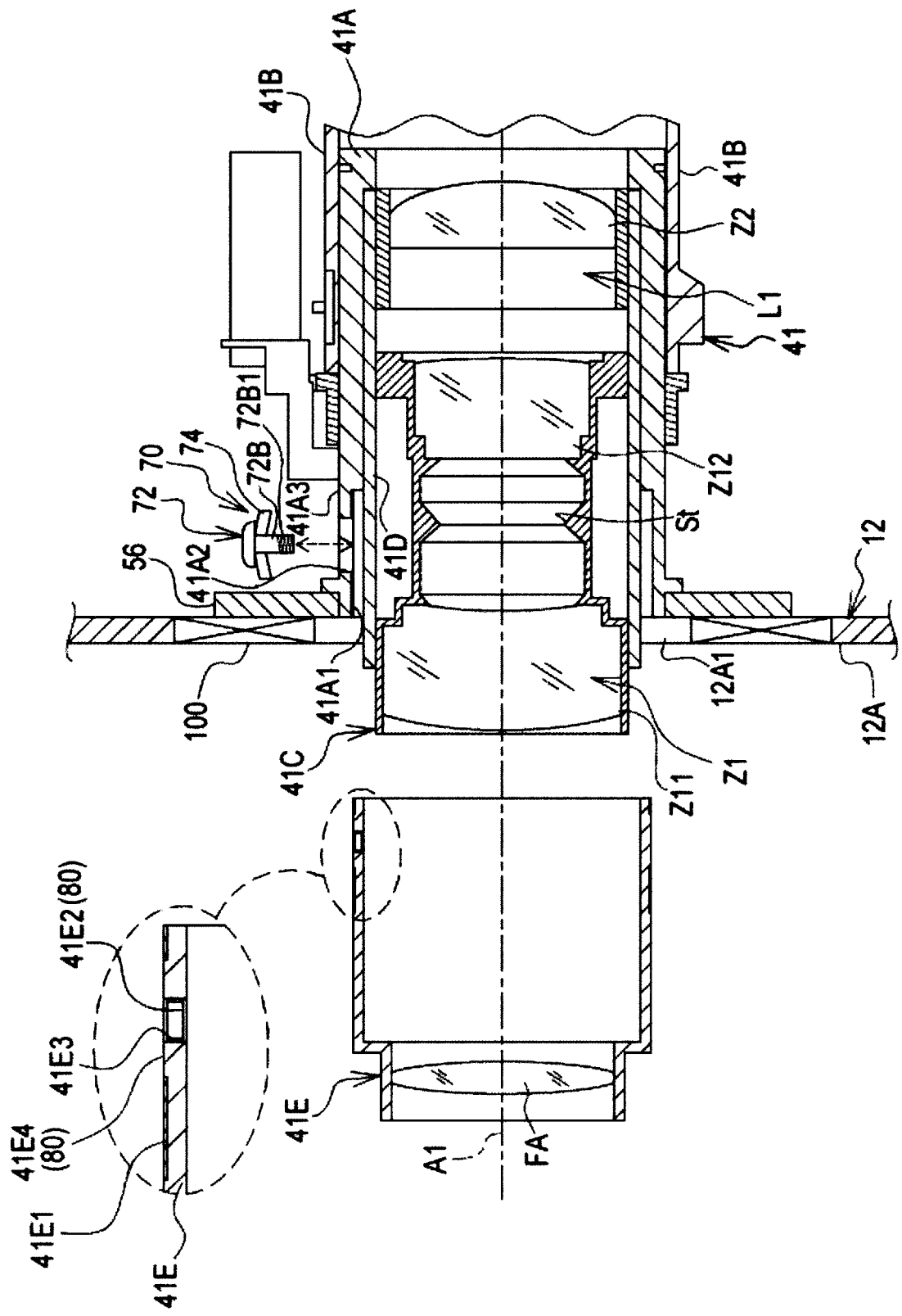
FIG. 11 is a longitudinal sectional view of the projection lens in a state in which a focus adjustment tube is removed from a first lens barrel portion.

When moving the focus adjustment tube 41E along the first optical axis A1 toward the body portion 12 side from the state shown in FIG. 9, first, the user pulls out the washer bolt 70 from the elongated hole 41A2 as illustrated in FIG. 10. Next, for example, the user inserts the bolt 72 of the washer bolt 70 into the screw box 41E2 that is exposed from one end side of the elongated hole 41A2 in the longitudinal direction. Then, by applying to the washer bolt 70 an external force in the arrow B direction shown in FIG. 8, the user rotates the focus adjustment tube 41E relative to the inner tube 41A to move the focus adjustment tube 41E along the first optical axis A1 toward the body portion 12 side.

By repeating similar operations, the focus adjustment tube 41E moves further toward the body portion 12 side along the first optical axis A1, and, shortly, the screw groove 41E3 separates from the screw groove 41A1. When the screw groove 41E3 separates from the screw groove 41A1 in this way, the focus adjustment tube 41E becomes removable from the projection lens 11 through the opening 56A of the flange 56. In the example shown in FIG. 11, a state in which the focus adjustment tube 41E has been removed from the projection lens 11 is illustrated.

On the other hand, when moving the focus adjustment tube 41E along the first optical axis A1 toward a side opposite to the body portion 12 side from the state shown in FIG. 9, first, the user pulls out the washer bolt 70 from the elongated hole 41A2 as illustrated in FIG. 10. Next, for example, the user inserts the bolt 72 of the washer bolt 70 into the screw box 41E2 that is exposed from the other end side of the elongated hole 41A2 in the longitudinal direction. Then, by applying to the washer bolt 70 an external force in a direction opposite to the arrow B direction shown in FIG. 8, the user rotates the focus adjustment tube 41E relative to the inner tube 41A to move the focus adjustment tube 41E along the first optical axis A1 toward a side opposite to the body portion 12 side.

The screw box 41E2, the peripheral surface 41E4, and the washer bolt 70 (fixing member) for the focus adjustment tube 41E are positioned on the outside of the body portion 12 relative to the flange 56. When the projection lens 11 configured in this way is attached to the body portion 12 by using the flange 56, a user can access at least one of the screw box 41E2 or the peripheral surface 41E4 from the first lens barrel portion 41 side through the elongated hole 41A2.

Then, the user moves the focus adjustment tube 41E along the first optical axis A1 by applying an external force to at least one of the user the screw box 41E2 or the peripheral surface 41E4. Accordingly, the projection lens 11 can allow the user to easily adjust the position of the lens FA on the first optical axis A1, compared with a case where the user is required to adjust the position of the lens FA on the first optical axis A1 after removing the projection lens 11 from the body portion 12.

Although a configuration example in which the bolt 72 of the washer bolt 70 is inserted into the screw box 41E2 is described here, the technology of the present disclosure is not limited to this. For example, a bar-shaped member may be inserted into the screw box 41E2, and the focus adjustment tube 41E may be rotated relative to the inner tube 41A by using a similar method. For example, a user may move the peripheral surface 41E4 in the longitudinal direction of the elongated hole 41A2 by inserting his/her finger into the elongated hole 41A2 and rotating the focus adjustment tube 41E relative to the inner tube 41A by using a force of his/her finger.

A first rotational-position sensor 59 is provided on the outer peripheral surface of the outer tube 41B. The first rotational-position sensor 59 detects the rotational position of the outer tube 41B relative to the inner tube 41A.

The first mirror holding portion 44 is integrally attached to the emission-side end portion of the outer tube 41B. Therefore, the first mirror holding portion 44 rotates around the first optical axis A1 as the outer tube 41B rotates around the first optical axis A1 relative to the inner tube 41A. The first mirror holding portion 44 holds the first mirror 48 in a position such that the reflection surface of the first mirror 48 has an angle of 45° with respect to each of the first optical axis A1 and the second optical axis A2. The first mirror 48 is a specular reflection mirror in which a transparent member such as glass is coated with a reflective film.

The second lens barrel portion 42 includes an outer tube 42A and the inner tube 42B. The incident-side end portion of the outer tube 42A is integrally attached to the first mirror holding portion 44. The inner tube 42B is attached to the outer tube 42A in such a way that the inner tube 42B is rotatable around the second optical axis A2.

The second lens barrel portion 42 holds a second optical system L2. The second optical system L2 is an example of an "intermediate optical system" according to the technology of the present disclosure, is constituted by, for example, a lens L21 and the lens L22, and is disposed on the second optical axis A2. The outer tube 42A holds the lens L21. The inner tube 42B holds the lens L22. The diameter of a plurality of lenses included in the lens group Z1 and a lens that constitutes the lens Z2 is smaller than the diameter of the lenses L21 and L22.

In the present example, the second optical system L2 functions as a relay lens. To be more specific, the first optical system L1 of the first lens barrel portion 41 forms an intermediate image in the first mirror holding portion 44. By using the intermediate image as an object, the second optical system L2 relays a light beam representing the intermediate image to the second mirror holding portion 46 and the third lens barrel portion 43.

In the second lens barrel portion 42, the second mirror holding portion 46 is integrally attached to the emission-side end portion of the inner tube 42B. Therefore, the second mirror holding portion 46 rotates around the second optical axis A2 as the inner tube 42B rotates around the second optical axis A2 relative to the outer tube 42A.

A second rotational-position sensor 60 is provided on the outer peripheral surface of the outer tube 42A. The second rotational-position sensor 60 detects the rotational position of the inner tube 42B relative to the outer tube 42A.

The second mirror holding portion 46 holds the second mirror 49 in a position such that the reflection surface of the second mirror 49 has an angle of 45° with respect to each of the second optical axis A2 and the third optical axis A3. The second mirror 49 is a specular reflection mirror similar to the first mirror 48.

An emission-side end portion 46A of the second mirror holding portion 46 constitutes the third lens barrel portion 43. The third lens barrel portion 43 includes, in addition to the end portion 46A, a fixed tube 43A, an emission lens holding frame 43B, and a focus lens barrel 43C.

The third lens barrel portion 43 holds a third optical system L3. The third optical system L3 is constituted by, for example, a lens L31, a lens L32, and the emission lens 16, and is disposed on the third optical axis A3. The end portion 46A is a tubular portion whose central axis substantially coincides with the third optical axis A3, and functions as a lens holding frame that holds the lens L31.

The fixed tube 43A is integrally attached to the emission side of the end portion 46A. The emission lens holding frame 43B is integrally attached to the emission-side end portion of the fixed tube 43A. The fixed tube 43A holds the focus lens barrel 43C on the inner peripheral side thereof in such a way that the focus lens barrel 43C is movable in the third optical axis A3 direction. The focus lens barrel 43C holds the focusing lens L32. The lens L32 is an example of a "focus optical system" according to the technology of the present disclosure, and is an optical element that focuses an optical image.

A gear 62 is provided on the outer periphery of the fixed tube 43A. The gear 62 rotates in the circumferential direction of the fixed tube 43A by being driven by the focusing motor 52. A screw groove is formed in the inner peripheral surface of the gear 62. A screw groove is formed also in the outer peripheral surface of the fixed tube 43A. The screw groove in the inner peripheral surface of the gear 62 and the screw groove in the outer peripheral surface of the fixed tube 43A mesh with each other. Therefore, when the gear 62 rotates, the gear 62 moves in the third optical axis A3 direction relative to the fixed tube 43A. A drive pin 62A is provided on the gear 62, and the drive pin 62A is inserted into the focus lens barrel 43C. Accordingly, as the gear 62 moves, the focus lens barrel 43C also moves along the third optical axis A3. Due to the movement of the focus lens barrel 43C, an in-focus position according to the distance between the screen 36 and the projection lens 11 is adjusted as the in-focus position on the reduction side of the projection lens 11.

Next, the operational advantages of the projection apparatus 10 (projector) according to present embodiment will be described.

First, in a state in which the focus adjustment tube 41E is attached to the incident-side end portion of the inner tube 41A through the opening 56A, a user inserts the focus adjustment tube 41E of the projection lens 11 into the insertion opening 12A1 of the body portion 12 as illustrated in FIG. 6. In the state in which the projection lens 11 is inserted into the insertion opening 12A1, the user fixes the flange 56 to the two-dimensional shift mechanism 100 of the body portion 12 by using a fixing member such as a screw (not shown).

Next, as illustrated in FIG. 4, the user directs the emission lens 16 toward the screen 36 and activates the body portion 12 by operating the operation panel 22. Thus, a light beam representing an image formed by the image forming unit 26 becomes incident on the projection lens 11 from the body portion 12, and a magnified image of the image based on image light based on a light beam incident on the projection lens 11 is projected onto the screen 36.

In the state illustrated in FIG. 4, that is, in a case where the projector 10 is placed in a horizontal position, as illustrated in FIG. 6, the lens group Z1 and lens Z2 are in the state of being arranged in a horizontal direction in the inner tube 41A. In this case, the weight effect that the lens group Z1 and the lens Z2 exert on the first lens barrel portion 41 is reduced, compared with a state in which the lens group Z1 and lens Z2 are arranged in the vertical direction, that is, a state in which the projector 10 is placed in a vertical position as illustrated in FIG. 3.

On the other hand, even in the state in which the projector 10 is placed in a vertical position as illustrated in FIG. 3, when driving of the zooming motor 51 is stopped, rotation restraining force of the zooming motor 51 acts on the inner tube 41A. Thus, the weight effect that the zooming lens group Z1 and lens Z2 exert on the first lens barrel portion 41 is reduced, compared with a case where the inner tube 41A is not connected to the zooming motor 51.

As heretofore described, in FIG. 6, the projection lens 11 includes the lens group Z1, the lens Z2, and the first lens barrel portion 41 that is connected to the body portion 12 and through which light along the first optical axis A1 passes. Moreover, the projection lens 11 includes the second lens barrel portion 42 through which light along the second optical axis A2 passes and that is rotatable relative to the first lens barrel portion 41. The lens group Z1 and the lens Z2 are held by the first lens barrel portion 41.

The position of the projector 10, in which the projection lens 11 configured in this way is installed, is used in a horizontal position (see FIG. 2) or in a vertical position (see FIG. 3). When the projector 10 is in a horizontal position, the first lens barrel portion 41 is used in a state in which the first optical axis A1 extends in a horizontal direction. In contrast, when the projector 10 is in a vertical position, the first lens barrel portion 41 is used in a state in which the first optical axis A1 extends in the vertical direction. That is, the lens group Z1 and the lens Z2 can be used in two states, which are a state of being arranged in the vertical direction and a state of being arranged in the horizontal direction.

Accordingly, the projection lens 11 can reduce the weight effect received from the lens group Z1 and the lens Z2, compared with a case where the arrangement direction of the lens group Z1 and the lens Z2 is constantly fixed to the vertical direction.

In FIG. 10, the projection lens 11 forms an intermediate image in the projection lens 11 and emits the intermediate image that has been formed, and the lens group Z1 and the lens Z2 are on the upstream side of the image forming position of the intermediate image in the optical path.

With the projection lens 11 configured in this way, a light beam becomes smaller on the reduction side, of the projection lens 11, of the image forming position of the intermediate image. Thus, with the projection lens 11, the lens group Z1 and the lens Z2 can be reduced in size, compared with a case where light is emitted from the projection lens 11 without forming an intermediate image in the projection lens 11.

The projection lens 11 includes the focusing lens L32 and the third lens barrel portion 43 through which light along the third optical axis A3 passes and that is rotatable relative to the second lens barrel portion 42. The focusing lens L32 is held by the third lens barrel portion 43. Accordingly, with the projection lens 11 configured in his way, the weight effect received from the lens L32 can be reduced, compared with a case where the third optical axis A3 of the lens L32 is constantly arranged in the vertical direction.

In the projection lens 11, the second lens barrel portion 42 has the second optical system L2. The diameter of a plurality of lenses included in the lens group Z1 and a lens that constitutes the lens Z2 is smaller than the diameter of the lenses L21 and L22 that constitute the second optical system L2. Accordingly, the projection lens 11 can reduce the weight effect received from the lens group Z1 and the lens Z2, compared with a case where the diameter of a plurality of lenses included in the lens group Z1 and a lens that constitutes the lens Z2 is greater than or equal to the diameter of the lenses L21 and L22 that constitute the second optical system L2.

The projection lens 11 includes the cam tube 41D that is connected to the zooming motor 51 and that changes the zoom ratio of the lens group Z1 and the lens Z2 by being provided with motive force of the zooming motor 51. Accordingly, the projection lens 11 can reduce the weight effect received from the lens group Z1 and the lens Z2 by using rotation restraining force of the zooming motor 51 when driving of the zooming motor 51 is stopped, compared with a case where the zoom ratio of the lens group Z1 and the lens Z2 is changed without using the zooming motor 51. On the other hand, it is not necessary to care for the weight effect of the lenses L21 and L22, because these lenses are fixed to the second lens barrel portion 42.

The projection lens 11 includes the fixed aperture stop St and the lens FA, which is disposed on the upstream side in the optical path relative to the fixed aperture stop St. Because the inside diameter of the fixed aperture stop St is smaller than the diameter of the lens FA, it is possible to reduce the size of the two-dimensional shift mechanism 100 and/or the attachment surface thereof and to allow the projection lens 11 to be movable in the in-plane direction of the attachment surface while maintaining the optical characteristics in the projection lens 11.

In the projection lens 11, a diaphragm lens may be used instead of an opening that is the fixed aperture stop St, and, in this case, the diaphragm lens is included in the lens group Z1 that is present in the zoom lens barrel 41C. Accordingly, the projection lens 11 can contribute to reduction in size of the projection lens 11, compared with a case where a diaphragm lens is present outside of the lens group Z1.

The projection lens 11 includes the focus adjustment tube 41E that holds the lens FA. The focus adjustment tube 41E is movable relative to the first lens barrel portion 41 in the direction in which the first optical axis A1 extends. Accordingly, the projection lens 11 can adjust the in-focus position on the reduction side of the projection lens 11.

Moreover, the projection lens 11 includes the focusing lens L32 and the lens group Z1. The lens group Z1 is positioned between the lens FA and the lens L32 in the optical path of the projection lens 11. Accordingly, the projection lens 11 can allow a user to easily check the state of the lens L32 and the lens FA from the outside, compared with a case where one of the lens L32 and the lens FA is positioned between the other of the lens L32 and the lens FA and the lens group Z1.

Although a case where a user adjusts the in-focus position on the reduction side of the projection lens 11 while checking a magnified image on the screen 36 is described in the embodiment, the technology of the present disclosure is not limited to this. For example, the in-focus position on the reduction side of the projection lens 11 may be adjusted before an image is projected onto the screen 36.

Although the flange 56 is used as an example in the embodiment, the technology of the present disclosure is not limited to this. Instead of the flange 56, another attachment portion for attaching the projection lens 11 to the body portion 12 may be used. An example of the other attachment portion is a screw groove. That is, a screw groove may be provided on each of the projection lens 11 side and the body portion 12 side, and the projection lens 11 may be enabled to be attached to the body portion 12 by meshing the screw groove on the projection lens 11 side and the screw groove on the body portion 12 side with each other. Another example of the other attachment portion is an elastic member. That is, an elastic member such as a packing may be provided on the projection lens 11 side, a press-fitting groove may be formed on the body portion 12 side, and the projection lens 11 may be enabled to be attached to the body portion 12 by press-fitting the elastic member on the projection lens 11 side into the press-fitting groove on the body portion 12 side.

Although the lens FA of the first focus optical system is described as an example in the embodiment, the technology of the present disclosure is not limited to this, and, for example, a focusing lens group having a plurality of lens may be used instead of the lens FA. Likewise, other optical systems may each be constituted by one lens or a plurality of lenses.

Although the elongated hole 41A2 is described as an example in the embodiment, the technology of the present disclosure is not limited to this. For example, a circular opening, a trapezoidal opening, or any opening that allows the peripheral surface 41E4 to be exposed may be used instead of the elongated hole 41A2.

As the image forming panel 32 corresponding to an electro-optical device, a transmissive image forming panel using an LCD may be used instead of a DMD. A panel using a light emitting element such as an LED (light emitting diode) and/or organic EL (electro luminescence) may be used instead of a DMD. As the reflection portion, a totally reflective mirror may be used instead of the specular reflection mirror.

Although an example in which a laser light source is used as the light source 34 is described in the above example, the light source 34 is not limited to this, and a mercury lamp and/or LED may be used as the light source 34. Although a blue laser light source and a yellow fluorescent body are used in the above example, the light source and the fluorescent body are not limited to these, and a green fluorescent body and a red fluorescent body may be used instead of a yellow fluorescent body. A green laser light source and a red laser light source may be used instead of a yellow fluorescent body.

In the present specification, "A and/or B" has the same meaning as "at least one of A or B". That is, "A and/or B" means only A, only B, or a combination of A and B. In the present specification, an idea similar to that of "A and/or B" is applied to a case where three or more matters are connected by using "and/or".

All documents, patent applications, and technical standards described in the present specification are incorporated in the present specification by reference to such a degree that each of the documents, patent applications, and technical standards are specifically and individually described as being incorporated herein by reference.

Regarding the embodiment described above, the following appendices will be further disclosed.

(Appendix 1)

A projection lens to be attached to a projection apparatus body having an electro-optical device, comprising:
- a zoom optical system that includes a plurality of lenses at least some of which move to change a zoom ratio;
- a first holding portion that is to be connected to the projection apparatus body and through which light along a first optical axis passes;
- a second holding portion through which light along a second optical axis, which is bent with respect to the first optical axis, passes and that is rotatable relative to the first holding portion; and
- an optical system that includes a lens and in which the lens is fixed to the second holding portion,
- wherein the optical system is capable of being oriented in a vertical direction due to rotation of the second holding portion, and
- wherein the zoom optical system is disposed on the electro-optical device side relative to the second holding portion along the first optical axis and is held by the first holding portion.

(Appendix 2)

The projection lens according to appendix 1,
- wherein the projection lens forms an intermediate image in the projection lens and emits the intermediate image that has been formed, and
- wherein the zoom optical system is on an upstream side of an image forming position of the intermediate image in an optical path.

(Appendix 3)

The projection lens according to appendix 1 or 2, comprising:
- a focus optical system; and
- a third holding portion through which light along a third optical axis, which is bent with respect to the second optical axis, passes and that is rotatable relative to the second holding portion,
- wherein the focus optical system is held by the third holding portion.

(Appendix 4)

The projection lens according to any one of appendices 1 to 3,
- wherein the optical system is an intermediate optical system, and
- wherein a diameter of a lens that constitutes the zoom optical system is smaller than a diameter of a lens that constitutes the intermediate optical system.

(Appendix 5)

The projection lens according to any one of appendices 1 to 4, comprising a zoom mechanism that is connected to a motor and that changes the zoom ratio of the zoom optical system by being provided with motive force of the motor.

(Appendix 6)

The projection lens according to appendix 5, wherein the zoom mechanism is disposed on the electro-optical device side relative to the second holding portion.

(Appendix 7)

The projection lens according to any one of appendices 1 to 6, comprising:
- an aperture stop portion provided in the first holding portion; and
- a first lens disposed on an upstream side of the aperture stop portion in an optical path,
- wherein the projection lens is movable in an in-plane direction of an attachment surface at which the projection lens is attached to the projection apparatus body, and
- wherein an inside diameter of the aperture stop portion is smaller than a diameter of the first lens.

(Appendix 8)

The projection lens according to appendix 7,
- wherein the aperture stop portion is a diaphragm lens, and
- wherein the zoom optical system includes the diaphragm lens.

(Appendix 9)

The projection lens according to appendix 7 or 8, comprising:
- an adjustment frame that holds the first lens,
- wherein the adjustment frame is movable relative to the first holding portion in a direction in which the first optical axis extends.

(Appendix 10)

The projection lens according to any one of appendices 7 to 9,
- wherein the first holding portion has a flange to be connected to the projection apparatus body, and
- wherein the zoom optical system protrudes from the projection apparatus body in the first holding portion from the flange to the first lens side.

(Appendix 11)

The projection lens according to appendix 10,
- wherein the zoom optical system extends in the first holding portion from the first lens side relative to the flange to the second holding portion side relative to the flange.

(Appendix 12)

The projection lens according to any one of appendices 1 to 11, wherein all of the plurality of lenses are held by the first holding portion.

(Appendix 13)

A projection apparatus comprising the projection lens according to any one of appendices 1 to 12 and the projection apparatus body.

(Appendix 14)

The projection apparatus according to appendix 13, comprising:
- a motor; and
- a zoom mechanism that is connected to the motor and that changes the zoom ratio of the zoom optical system as a gear is rotated by motive force of the motor,
- wherein the projection apparatus corresponds to a first arrangement state in which an extension direction of the first optical axis is a horizontal direction and a second arrangement state in which the extension direction of the first optical axis is a vertical direction, and
- wherein the motor applies rotation restraining force to the gear when the motor is stopped.

What is claimed is:

1. A projection lens to be attached to a projection apparatus body having an electro-optical device, comprising:
   a zoom optical system including two groups of lenses;
   a first holding portion that is to be directly connected to the projection apparatus body and through which light along a first optical axis passes; and
   a second holding portion through which light along a second optical axis, which is bent with respect to the first optical axis, passes and that is rotatable relative to the first holding portion,
   wherein the two groups of lenses are held by the first holding portion such that one of the two groups of lenses are movable relative to the other of the two groups of lenses along the first optical axis.

2. The projection lens according to claim 1,
wherein the projection lens forms an intermediate image in the projection lens and emits the intermediate image that has been formed, and
wherein the zoom optical system is on an upstream side of an image forming position of the intermediate image in an optical path.

3. The projection lens according to claim 2, comprising:
a focus optical system; and
a third holding portion through which light along a third optical axis, which is bent with respect to the second optical axis, passes and that is rotatable relative to the second holding portion,
wherein the focus optical system is held by the third holding portion.

4. The projection lens according to claim 2,
wherein the second holding portion has an intermediate optical system, and
wherein a diameter of a lens that constitutes the zoom optical system is smaller than a diameter of a lens that constitutes the intermediate optical system.

5. The projection lens according to claim 2, comprising:
a zoom mechanism that is connected to a motor and that changes a zoom ratio of the zoom optical system by being provided with motive force of the motor.

6. The projection lens according to claim 2, comprising:
an aperture stop portion provided in the first holding portion; and
a first lens disposed on an upstream side of the aperture stop portion in an optical path,
wherein the projection lens is movable in an in-plane direction of an attachment surface at which the projection lens is attached to the projection apparatus body, and
wherein an inside diameter of the aperture stop portion is smaller than a diameter of the first lens.

7. The projection lens according to claim 1, comprising:
a focus optical system; and
a third holding portion through which light along a third optical axis, which is bent with respect to the second optical axis, passes and that is rotatable relative to the second holding portion,
wherein the focus optical system is held by the third holding portion.

8. The projection lens according to claim 7,
wherein the second holding portion has an intermediate optical system, and
wherein a diameter of a lens that constitutes the zoom optical system is smaller than a diameter of a lens that constitutes the intermediate optical system.

9. The projection lens according to claim 7, comprising:
a zoom mechanism that is connected to a motor and that changes a zoom ratio of the zoom optical system by being provided with motive force of the motor.

10. The projection lens according to claim 7, comprising:
an aperture stop portion provided in the first holding portion; and
a first lens disposed on an upstream side of the aperture stop portion in an optical path,
wherein the projection lens is movable in an in-plane direction of an attachment surface at which the projection lens is attached to the projection apparatus body, and
wherein an inside diameter of the aperture stop portion is smaller than a diameter of the first lens.

11. The projection lens according to claim 1,
wherein the second holding portion has an intermediate optical system, and
wherein a diameter of a lens that constitutes the zoom optical system is smaller than a diameter of a lens that constitutes the intermediate optical system.

12. The projection lens according to claim 11, comprising:
a zoom mechanism that is connected to a motor and that changes a zoom ratio of the zoom optical system by being provided with motive force of the motor.

13. The projection lens according to claim 11, comprising:
an aperture stop portion provided in the first holding portion; and
a first lens disposed on an upstream side of the aperture stop portion in an optical path,
wherein the projection lens is movable in an in-plane direction of an attachment surface at which the projection lens is attached to the projection apparatus body, and
wherein an inside diameter of the aperture stop portion is smaller than a diameter of the first lens.

14. The projection lens according to claim 1, comprising:
a zoom mechanism that is connected to a motor and that changes a zoom ratio of the zoom optical system by being provided with motive force of the motor.

15. The projection lens according to claim 14, comprising:
an aperture stop portion provided in the first holding portion; and
a first lens disposed on an upstream side of the aperture stop portion in an optical path,
wherein the projection lens is movable in an in-plane direction of an attachment surface at which the projection lens is attached to the projection apparatus body, and
wherein an inside diameter of the aperture stop portion is smaller than a diameter of the first lens.

16. The projection lens according to claim 1, comprising:
an aperture stop portion provided in the first holding portion; and
a first lens disposed on an upstream side of the aperture stop portion in an optical path,
wherein the projection lens is movable in an in-plane direction of an attachment surface at which the projection lens is attached to the projection apparatus body, and
wherein an inside diameter of the aperture stop portion is smaller than a diameter of the first lens.

17. The projection lens according to claim 16,
wherein the aperture stop portion is a diaphragm lens, and
wherein the zoom optical system includes the diaphragm lens.

18. The projection lens according to claim 17, comprising:
an adjustment frame that holds the first lens,
wherein the adjustment frame is movable relative to the first holding portion in a direction in which the first optical axis extends.

19. The projection lens according to claim 16, comprising:
an adjustment frame that holds the first lens,
wherein the adjustment frame is movable relative to the first holding portion in a direction in which the first optical axis extends.

20. The projection lens according to claim 1, comprising:
an optical system that includes a lens and in which the lens is fixed to the second holding portion, wherein the optical system is capable of being oriented in a direction perpendicular to the first optical axis due to rotation of the second holding portion, and wherein light from the electro optical device passes through the first holding portion and the second holding portion along the first optical axis and the second optical axis, respectively.

\* \* \* \* \*